(12) United States Patent
Sahashi et al.

(10) Patent No.: US 7,561,035 B2
(45) Date of Patent: Jul. 14, 2009

(54) WIRELESS SENSOR SYSTEM AND BEARING ASSEMBLY EQUIPPED WITH THE SAME

(75) Inventors: Koji Sahashi, Iwata (JP); Koichi Okada, Iwata (JP); Masatoshi Mizutani, Iwata (JP)

(73) Assignee: NTN Corporation, Osaka (JP)

( * ) Notice: Subject to any disclaimer, the term of this patent is extended or adjusted under 35 U.S.C. 154(b) by 408 days.

(21) Appl. No.: 10/526,903

(22) PCT Filed: Sep. 8, 2003

(86) PCT No.: PCT/JP03/11459

§ 371 (c)(1),
(2), (4) Date: Mar. 7, 2005

(87) PCT Pub. No.: WO2004/023422

PCT Pub. Date: Mar. 18, 2004

(65) Prior Publication Data

US 2005/0258950 A1    Nov. 24, 2005

(30) Foreign Application Priority Data

Sep. 9, 2002 (JP) ............................. 2002-262262
Aug. 29, 2003 (JP) ............................. 2003-306181

(51) Int. Cl.
*B60C 23/00* (2006.01)
(52) U.S. Cl. .................. 340/442; 73/146.3; 701/36
(58) Field of Classification Search ................ 340/442, 340/444, 447, 870.07; 73/146.3; 701/36
See application file for complete search history.

(56) References Cited

U.S. PATENT DOCUMENTS 3,723,966 A * 3/1973 Mueller et al. .............. 340/447
4,263,579 A * 4/1981 Corgan et al. .............. 340/447
4,609,905 A * 9/1986 Uzzo ........................... 340/447

(Continued)

FOREIGN PATENT DOCUMENTS

CN    1412564    4/2003

(Continued)

OTHER PUBLICATIONS

Hodate Masahito, Patent Abstracts of Japan, "Tire Inside Monitor Device", Publication No. 04-133808, Date: May 7, 1992.

(Continued)

*Primary Examiner*—Timothy Edwards, Jr.

(57) ABSTRACT

A wireless sensor system of the present invention includes wireless sensor units (4A, 4B) and a sensor signal receiving unit (5). The sensor units (4A, 4B) have sensors (6A, 6B), an electric power receiver (8A, 8B) for securing the electric power from an electromagnetic wave of a power feeding frequency f1 through a tuning circuit and a detecting and rectifying circuit, and sensor signal transmitters (9A, 9B) for transmitting the signals outputted from the sensors as a wireless sensor signal of the electromagnetic wave of unique frequencies f2 and f3 different from the power feeding frequency f1. The sensor signal receiving unit (5) has an electric power transmitter (12) for transmitting the electromagnetic wave of the power feeding frequency f1 to the units (4A, 4B) and a sensor signal receiver (13) for receiving wireless the sensor signals of the respective frequencies f2 and f3 transmitted from the units (4A, 4B).

28 Claims, 10 Drawing Sheets

U.S. PATENT DOCUMENTS

| | | | |
|---|---|---|---|
| 4,749,993 | A | 6/1988 | Szabo et al. |
| 4,966,034 | A * | 10/1990 | Bock et al. .................. 73/146.5 |
| 5,181,423 | A * | 1/1993 | Philipps et al. ............... 73/724 |
| 6,378,360 | B1 * | 4/2002 | Bartels ...................... 73/146.5 |
| 6,535,116 | B1 * | 3/2003 | Zhou .......................... 340/447 |
| 6,609,419 | B1 * | 8/2003 | Bankart et al. ............. 73/146.5 |
| 6,696,935 | B2 | 2/2004 | Bonardi et al. |
| 6,838,985 | B2 * | 1/2005 | Ghabra et al. ............... 340/445 |
| 6,958,685 | B2 | 10/2005 | Desai |
| 6,980,084 | B1 | 12/2005 | Yones |
| 7,018,106 | B2 | 3/2006 | Okada |
| 7,021,132 | B2 * | 4/2006 | Nigon et al. ............... 73/146.5 |
| 7,034,711 | B2 | 4/2006 | Sakatani et al. |
| 7,104,438 | B2 | 9/2006 | Benedict |
| 7,148,793 | B2 | 12/2006 | Lin |
| 7,262,743 | B2 * | 8/2007 | Locatelli et al. ............. 343/841 |
| 2003/0030565 | A1 | 2/2003 | Sakatani et al. |
| 2003/0093188 | A1 | 5/2003 | Morita et al. |
| 2003/0110860 | A1 | 6/2003 | Okada |
| 2004/0150516 | A1 * | 8/2004 | Faetanini .................... 340/444 |
| 2005/0046559 | A1 * | 3/2005 | Kulha ......................... 340/445 |
| 2005/0068161 | A1 | 3/2005 | Ichinose et al. |
| 2005/0231346 | A1 | 10/2005 | Ichinose et al. |
| 2006/0125599 | A1 * | 6/2006 | Ghabra et al. .............. 340/5.61 |

FOREIGN PATENT DOCUMENTS

| | | |
|---|---|---|
| CN | 1424212 | 6/2003 |
| JP | 4-65800 | 3/1992 |
| JP | 8-10232 | 1/1996 |
| JP | 10-10141 | 1/1998 |
| JP | 2002-364661 | 12/2002 |
| JP | 2002-544612 | 12/2002 |
| JP | 2003-58976 | 2/2003 |
| JP | 2003-146196 | 5/2003 |
| JP | 2003-151063 | 5/2003 |
| JP | 2003-151064 | 5/2003 |
| JP | 2003-187368 | 7/2003 |
| WO | 00/69663 | 11/2000 |

OTHER PUBLICATIONS

Hoshino Masaru, Patent Abstracts of Japan, Pressure Detection System Using Signal Transmission Device and Pressure Detecting Roll, Publication No. 2001-349794, Publication Date: Dec. 21, 2001.

Ibamoto Masaiko et al., Patent Abstracts of Japan, Torque Detection System, Publication No. 09-005178, Date: Jan. 10, 1997.

Hattori Yasushi, Patent Abstracts of Japan, "Device for Monitoring Air Pressure In Tire of Vehicle", Publication No. 10-019710, Date: Jan. 23, 1998.

Asano Tomio et al., Patent Abstracts of Japan, "Data Communication Method and Device Therefor", Publication No. 11-238193, Date: Aug. 31, 1999.

Shima Yasushi, Patent Abstracts of Japan, "Radio Transmission Equipment", Publication No. 64-060118, Publication Date: Mar. 7, 1989.

Okada Koichi, Patent Abstracts of Japan, "Antilock Braking System", Publication No. 2001-151090, Publication Date: Jun. 5, 2001.

Otsuki Hisashi et al., Patent Abstracts of Japan, "Bearing Device for Wheel", Publication No. 2002-055113, Publication Date: Feb. 20, 2002.

U.S. Appl. No. 10/569,053, filed Feb. 22, 2006, Mizutani et al., NTN Corporation.

U.S. Appl. No. 10/572,308, filed Mar. 17, 2006, Okada et al., NTN Corporation.

Office Action mailed Feb. 19, 2009 for co-pending U.S. Appl. No. 10/569,053.

Office Action mailed Feb. 24, 2009 for co-pending U.S. Appl. No. 10/572,308.

* cited by examiner

WIRELESS SENSOR SYSTEM AND BEARING ASSEMBLY EQUIPPED WITH THE SAME

FIELD OF THE INVENTION

The present invention generally relates to a wireless sensor system for wireless receiving a detection signal indicative of, for example, the tire pressure or the number of revolutions of a wheel in an automotive vehicle. The present invention also relates to a bearing assembly equipped with such wireless sensor system and a wheel support bearing assembly equipped with such wireless sensor system.

BACKGROUND ART

It is known that various sensors are employed in automotive vehicles and various industrial machines to detect various target parameters such as the number of revolutions, the temperature and the vibration of bearing assembly and/or any other movable component parts with a view to controlling of the machines and supervision of machine statuses. Outputs generated from those sensors are generally transmitted through a wired communication system. However, it has often been experienced that the wired communication system is available only where wiring is possible, and where no wiring is possible, a wireless sensor system that transmits sensor signals wireless in the form of wireless electromagnetic signals is available. In this wireless sensor system, a transmitter is generally equipped with a compact battery.

By way of example, as far as automotive vehicles are concerned, in order to improve the safety of automotive vehicles by means of an early detection of a tire puncture or prediction of blowout through detection of the tire pressure being reduced, it is a recent trend to impose an obligation to utilize a tire pressure sensor for detecting the decrease of the tire pressure. Most of the conventional air pressure sensors for this purpose are generally of a design in which the detection signal indicative of the tire pressure is transmitted wireless to an automotive body structure by means of an electromagnetic wave. The wireless transmitter for transmitting the detection signal wireless from the air pressure sensor to the automotive body structure is, in most cases, integrated with a compact battery built therein so that the wireless transmitter can be electrically powered.

On the other hand, the anti-lock brake system (ABS) for controlling an automotive brake system by detection of the number of revolutions of the wheel with a rotation sensor has been well known. In this anti-lock brake system, in order to avoid an automobile accident resulting from breakage of a wiring system for the rotation sensor and also to minimize the cost of assemblage, the detection signal, indicative of the number of revolutions of the automobile wheel, generated by the rotation sensor is transmitted wireless in the form of an electromagnetic wave, such as disclosed in the Japanese Laid-open Patent Publication No. 2001-151090.

The Japanese Laid-open Patent Publication No. 2002-55113, for example, discloses a rotation sensor in the form of a multipolar electric power generator. The multipolar electric power generator is utilized not only to supply an electric power both the sensor and the wireless transmitter, but also to detect the number of revolutions of the automobile wheel. According to this patent publication, no supply of an electric power from the automotive body structure to the rotation sensor is needed and, accordingly, the system as a whole can be advantageously assembled compact.

The sensor system utilizing the battery has the following problems. In the first place, since the battery has a limited life, routine battery replacement is necessary resulting in complicated and cumbersome management of the lifetime of the battery. Other problems are associated with the environmental contamination resulting from disposal of the battery. In addition, where the rotation sensor utilizing the battery is used in a wheel support bearing assembly or in detecting the tire pressure, an unbalanced wheel rotation may occur as a result of increase of the sensor weight.

On the other hand, in the rotation sensor capable of generating the electric power, the electric power is generated only when the wheel starts its rotation. Therefore, the detection of the number of revolutions of the wheel tends to be unstable when the wheel rotates at an extremely low speed approximating to a halt, although the rotation sensor works satisfactorily when the wheel rotates at a speed equal to or higher than about 10 Km/h, at which the ABS is often activated. Also, this type of the rotation sensor cannot be used to detect other target parameters such as the temperature.

As discussed above, the self-generating rotation sensor is not capable of generating or supplying an electric power in some cases. Particularly, where sensors other than a rotation-detecting sensor are utilized, it has been found difficult to secure supply of an electric power to the sensors and transmission of sensor signals from those sensors.

DISCLOSURE OF THE INVENTION

In view of the foregoing, the present invention has for its essential object to provide an improved wireless sensor system, which is light-weighted and compact in structure and can easily be serviced, and which can be actively used in communication at any time, while being capable of accomplishing both supply of an electric power to a plurality of wireless sensors and transmission of wireless sensor signals.

Another important object of the present invention is to provide an improved wireless sensor system, which is light-weighted and compact in structure and can easily be serviced, and which can be actively used in communication at any time, while being capable of accomplishing both supply of an electric power to a plurality of wireless sensor units and transmission of wireless sensor signals.

A further object of the present invention is to provide a wireless sensor system of an automobile vehicle, which is capable of transmitting a wireless sensor signal indicative of, for example, the tire pressure and/or the number of revolutions of the vehicle wheel, reduction in cost and maintenance-free as a result of elimination of use of any battery, securement of a balanced wheel rotation resulting from reduction in weight and operation of the sensor even at an extremely low speed rotation of the wheel.

A still further object of the present invention is to provide a bearing assembly equipped with a wireless sensor unit and a wheel support bearing assembly equipped with a wireless sensor unit, which are light-weighted and compact in structure and can easily be serviced, and which can be actively used in communication at any time, while being capable of both supply of an electric power to a plurality of wireless sensors and transmission of wireless sensor signals.

In order to accomplish the foregoing objects of the present invention, a wireless sensor system according to a first aspect of the present invention includes a plurality of sensors (6A to 6E) for detecting respective parameters to be detected, a sensor signal transmitter (9A, 9B, 9) for transmitting wireless sensor signals outputted respectively from the sensors (6A to 6E), an electric power receiver (8A, 8B, 8) for receiving wireless an electric operating power required to drive the sensors (6A to 6E) and the sensor signal transmitter (9A, 9B, 9), a sensor signal receiver (13) for receiving the sensor signals transmitted from the sensor signal transmitter (9A, 9B, 9) and an electric power transmitter (12) for transmitting the electric operating power wireless to the electric power receiver (8A, 8B, 8). Wireless transmission of the sensor signals and the electric operating power may be carried out by the utilization of not only electromagnetic waves, but also any of magnetic coupling, optical beams and ultrasonic waves, and any wireless transmission technique can be employed in the practice of the present invention.

According to this aspect of the present invention, since the plural sensors (6A to 6E) and the sensor signal transmitter (9A, 9B, 9) are both electrically powered by the electric operating power transmitted wireless from the electric power transmitter (12), neither the battery nor any electric generator as an electric power source for the sensors (6A to 6E) need be employed and, accordingly, the wireless sensor system can be designed compact and light-weighted and is substantially maintenance-free since no replacement of the battery is required. Unlike the rotation sensor capable of self-generation, the wireless sensor system of the present invention is capable of performing detection and transmission at any time regardless of operating statuses of the machine and equipment employing the wireless sensor system.

In this wireless sensor system, the sensor signal receiver (13) may have a capability of receiving the sensor signals from the respective sensors (6A to 6E), which are transmitted by the sensor signal transmitter (9A, 9B, 9), and the electric power transmitter (12) may be disposed in a sensor signal receiving unit (5, 5A) including the sensor signal receiver (13). In this case, since the common sensor signal receiving unit (5, 5A) operates to receive the sensor signals from the plural sensors (6A to 6E) and transmission of the electric operating power to the electric power receiver (8A, 8B, 8), the wireless sensor system as a whole can be simplified in structure.

The wireless sensor system may include a plurality of wireless sensor units (4A, 4B) each including the sensors (6A, 6B), the sensor signal transmitter (9A, 9B) and the electric power receiver (8A, 8B). While the sensors (6A, 6B), the sensor signal transmitter (9A, 9B) and the electric power receiver (8A, 8B) are provided separately, they may be integrated together to provide a unitary structure that can easily be handled. By way of example, the sensors (6A, 6B), the sensor signal transmitter (9A, 9B) and the electric power receiver (8A, 8B) are accommodated within a common casing or provided on a common board, or the sensor signal transmitter (9A, 9B) and the electric power receiver (8A, 8B) are integrated together to form a receiver-transmitter subunit while the sensors (6A, 6B) are connected to the receiver-transmitter subunit by means of an electric wiring.

In this case, since each of the plural wireless sensor units (4A, 4B) includes the sensors (6A, 6B), the sensor signal transmitter (9A, 9B) and the electric power receiver (8A, 8B) so that each sensor unit (4A, 4B) can perform the transmission of the sensor signals and the receipt of the electric power, the wireless sensor units (4A, 4B) can be disposed separated from each other, resulting in large freedom of disposition of the wireless sensor units (4A, 4B).

In the practice of the present invention, as shown in FIG. 8 corresponding to a preferred embodiment thereof, the wireless sensor system may include a single wireless sensor unit (4), which in turn includes a plurality of the sensors (6C to 6E), the sensor signal transmitter (9) and the electric power receiver (8). The sensor signal transmitter (9) of this single wireless sensor unit (4) transmits the sensor signals of the plural sensors (6C to 6E) wireless. In this case, since the sensor signals outputted respectively from the plural sensors (6C to 6E) can be transmitted through the single signal transmitter (9), the structure can be further simplified and become compact.

Where the plural wireless sensor units (4A, 4B) are employed, some or all of the plural wireless sensor units (4A, 4B) may include the plural sensors (6C to 6E). In such case, each sensor signal transmitter in such some or all of the wireless sensor units (4A, 4B) is operable to transmit the sensor (detection) signals of the plural sensors (6C to 6E). According to this feature, the wireless sensor unit (4A, 4B) including the plural sensors (6C to 6E) or the wireless sensor unit (4A, 4B) including the single sensor (6A, 6B) can be chosen depending on the machine and equipment requiring the sensor unit (4A, 4B) and, therefore, the present invention can advantageously be applied in many ways.

According to a second aspect of the present invention, there is provided a wireless sensor system which includes a plurality of wireless sensor units (4A, 4B) and a sensor signal receiving unit (5, 5A) for supplying wireless an electric power to each of those wireless sensor units (4A, 4B) and for receiving a sensor signal transmitted from each of those wireless sensor units (4A, 4B). Each of the wireless sensor units (4A, 4B) includes an electric power receiver (8A, 8B) including a tuning circuit and a detecting and rectifying circuit for securing an electric operating power from an electromagnetic wave of a predetermined power feeding frequency; a sensor (6A, 6B) for detecting a parameter to be detected; and a sensor signal transmitter (9A, 9B) for transmitting a signal detected by the sensor (6A, 6B) as a wireless sensor signal in the form of an electromagnetic wave of a natural frequency different from the power feeding frequency. The sensor signal receiving unit (5, 5A) includes an electric power transmitter (12) for transmitting wireless the electromagnetic wave of the predetermined power feeding frequency and a sensor signal receiver (13) for receiving the wireless sensor signal of the natural frequency that is transmitted wireless from each of the wireless sensor units (4A, 4B).

According to this second aspect of the present invention, since the electric operating power can be supplied in the form of the electromagnetic wave from the electric power transmitter (12) to each of the wireless sensor units (4A, 4B), neither a battery nor an electric generator for providing an electric operating power need be employed in the sensor units and, therefore, not only can the sensor units (4A, 4B) be assembled compact and lightweight, but also the maintenance can easily be accomplished because of elimination of the need to perform a battery replacement. Also, since the single sensor signal receiving unit (5, 5A) is employed to supply wireless the electric operating power to each of the plural wireless sensor units (4A, 4B) and also to receive the wireless sensor signal transmitted from each of the plural wireless sensor units (4A, 4B), the wireless sensor system as a whole can advantageously be simplified in structure.

The sensor signal receiver (13) of the sensor signal receiving unit (5) may include a plurality of receiving circuits (13a) each operable to receive a single frequency corresponding to the assigned natural frequency transmitted from each of the wireless sensor units (4A, 4B). The use of the independent and separate receiving circuits (13a) makes it possible for each of the receiving circuits (13a) to be simplified in structure.

Also, the sensor signal receiver (13) of the sensor signal receiving unit (5) may include a plurality of tuning circuits (37A, 37B) each operable to receive a single frequency corresponding to the assigned natural frequency transmitted from each of the wireless sensor units (4A, 4B), and a switching detector (41) for switching between outputs of the tuning circuits (37A, 37B) to select the outputs one at a time on a time sharing basis and for detecting each of the selected outputs. According to this structural feature, although the switching detector (41) requires the use of a switching means, the single detector (42) is effective to discriminate and detect the wireless sensor signals and, therefore, even where the number of the wireless sensor units (4A, 4B) employed is large, the sensor signal receiving unit (5A) can be simplified in structure.

Preferably, the sensor signal receiver (13) of the sensor signal receiving unit (5A) is capable of varying a receiving frequency and is capable of receiving the plural wireless sensor signals by switching among the varying receiving frequencies on a time sharing basis. By way of example, the sensor signal receiver (13) of the sensor signal receiving unit (5) may include a single tuning circuit capable of varying a tuning frequency in correspondence with the natural frequency transmitted from each of the wireless sensor units (4A, 4B), and a circuit for switching and detecting the natural frequency of the tuning circuit on a time sharing basis.

In the case of this circuit construction, a means for varying a tuning frequency is required. However, where the number of the receiving frequencies is large, there is no need to use a plurality of tuning circuits and, therefore, simplification of the structure and reduction of the weight of the sensor signal receiving unit (5) are possible.

In the practice of the present invention, the plane of polarization of the electromagnetic wave for power feeding may be different from that of the electromagnetic wave of the wireless sensor signal. While the use of the different frequencies between the electromagnetic wave for the power feeding and the electromagnetic wave for the wireless sensor signal is effective to avoid any possible interference brought about by the transmitted electric power on the receiving circuit, the use of the different planes of polarization of such electromagnetic waves is effective to enhance the signal separation between the wireless sensor unit (4A, 4B) and the sensor signal receiving unit (5A).

Also, the respective electromagnetic waves of the wireless sensor signals transmitted from the associated wireless sensor units (4A, 4B) may have different planes of polarization. While by using the different frequencies for the wireless sensor signals signal reception can be discriminated, the use of the different planes of polarization is effective to enhance the signal separation between the wireless sensor units (4A, 4B).

In the practice of the present invention, as shown in FIG. 7 where the plural wireless sensor units (4A, 4B) are employed, those wireless sensor units (4A, 4B) may be mounted on different bearings (51, 52) in a machine plant (53). The machine plant (53) may include a machine installed in a factory such as an industrial machine, a machine tool and/or a transport machine, or a railway car and/or an automotive vehicle. The bearings (51, 52) may be a rolling bearing or the like. By way of example, the machine plant (53) may a conveyor line and each of the bearings (51, 51) on which the wireless sensor unit (4A, 4B) is mounted may be a bearing for supporting a drive roller of the conveyor.

Also, where the plural wireless sensor units (4A, 4B) are employed, as shown in FIG. 4 or FIG. 6, at least one of the plural wireless sensor units (4A, 4B) may include the sensor (6A) utilized as a tire pressure sensor for detecting a tire pressure of an automotive vehicle or a rotation sensor for a wheel support bearing assembly. Alternatively, each of the wireless sensor units (4A, 4B) may include both a tire pressure sensor (6B) and a rotation sensor (6A). The rotation sensor (6A) acts as a wheel rotation sensor.

Where the wireless sensor unit (4A, 4B) includes a tire pressure sensor as the sensor (6B), no battery is necessary in the present invention and, therefore, not only is the maintenance-free possible with respect to the battery replacement, but a balance of a wheel can also be secured as a result of reduction in weight. On the other hand, where the wireless sensor unit (4A, 4B) includes a wheel rotation sensor as the sensor (6A), unlike an electric power generator generating an electric power in response to rotation of the vehicle wheel, the electric power can be supplied from the electric power transmitter (12) mounted on the vehicle body structure even when the automotive vehicle is halted and, therefore, the use of the sensor (6A) in combination with an active sensor such as a Hall IC (integrated circuit) makes it possible to achieve a generally so-called zero velocity detection (i.e., detection of the rotation in a condition in which the automotive vehicle is substantially halted). Accordingly, the running stability can be obtained by means of a highly sophisticated control such as a control of the ABS activation shortly before the automotive vehicle then running on a low frictional road surface is brought to a halt, and a traction control at the time of abrupt acceleration and at the time of an extremely low speed run.

Where the wireless sensor unit (4B) for the tire pressure and the wireless sensor unit (4A) for the detection of the wheel rotation are both employed, since those wireless sensor units (4A, 4B) are disposed in the vicinity of a wheel within the same tire house, not only can the supply of the electric power to the plural wireless sensor units (4A, 4B) easily be accomplished, but also transmission of the wireless sensor signals can be achieved by a feeble magnetic wave.

According to a third aspect of the present invention, the present invention also provides a bearing assembly equipped with a wireless sensor unit, which includes a plurality of wireless sensor units (4A, 4B) mounted on a bearing. Each of the wireless sensor units (4A, 4B) includes a sensor (6A, 6B) for detecting a parameter to be detected, a sensor signal transmitter (9A, 9B) for transmitting wireless a sensor signal outputted from the sensor (6A, 6B), and an electric power receiver (8A, 8B) for receiving wireless an electric operating power required to drive the sensor (6A, 6B) and the sensor signal transmitter (9A, 9B).

According to the third aspect of the present invention, while the supply of the electric power to the plural sensors (6A, 6B) and the transmission of the sensor signals from the plural sensors (6A, 6B) can be accomplished, not only can the bearing assembly of a lightweight and compact structure be achieved, but the maintenance is also easy, and even when the bearing assembly is in a halted condition, the communication is possible.

According to a fourth aspect of the present invention, there is provided a bearing assembly (33) equipped with a wireless sensor unit, which includes one of a plurality of wireless sensor units (4A, 4B) that is mounted on a bearing. Each of the plural wireless sensor units (4A, 4B) includes a sensor (6A, 6B) for detecting a parameter to be detected; a sensor signal transmitter (9A, 9B) for transmitting wireless a sensor signal outputted from the sensor (6A, 6B), and an electric power receiver (8A, 8B) for receiving wireless an electric operating power required to drive the sensor (6A, 6B) and the sensor signal transmitter (9A, 9B). The plural wireless sensor units (4A, 4B) are operable to transmit to a common sensor signal receiver (13) the respective sensor signals transmitted from the corresponding sensor signal transmitters (6A, 6B) and is also operable to receive the electric operating power wireless from a common electric power transmitter (12) through the electric power receiver (8A, 8B).

According to the third aspect of the present invention, the wireless sensor unit (4A, 4B), mounted on the bearing, and the wireless sensor unit (4A, 4B) mounted on any other machine or equipment can transmit the sensor signals to the common sensor signal receiver (13) and can be electrically powered by the electric power transmitter (12) and, accordingly, the bearing assembly of a simplified structure can be provided.

The present invention in accordance with a fifth aspect thereof provides a bearing assembly equipped with a wireless sensor, which includes a plurality of sensors (6C to 6E) for detecting respective parameters to be detected, a sensor signal transmitter (9) for transmitting wireless sensor signals outputted from the respective sensors (6C to 6E), and an electric power receiver (8) for receiving wireless an electric operating power required to drive the sensors (6C to 6E) and the sensor signal transmitter (9).

According to the fifth aspect of the present invention, the plural sensors (6C to 6E), for example, the rotation sensor, the temperature sensor and the vibration sensor can be mounted on a bearing and the sensor signals outputted therefrom can be transmitted through the sensor signal transmitter (9). Receipt of the electric power can also be performed through the common electric power receiver (8) and, therefore, the bearing assembly of a simplified structure can be provided.

In the bearing assembly equipped with the wireless sensor of any of the foregoing structures in accordance with the present invention, at least one of the sensors (6a to 6E) mounted on the bearing may be a rotation sensor which includes a multipolar magnet (17), having a plurality of magnetic poles deployed in a direction circumferentially thereof, and a magnetic sensor (18) for detecting the magnetic poles of the multipolar magnet. The magnetic sensor (18) is preferably in the form of a magnetoresistive sensor.

Where the rotation sensor is made up of the multipolar magnet (17) and the magnetic sensor (18), it is possible to construct a compact rotation sensor having a high resolution. Also, the magnetoresistive sensor (18) consumes a relatively small amount of electric power and, therefore, can be suitably utilized in combination with the wireless electric power feeding that is generally low in efficiency of electric power feeding as compared with the wired system.

In the bearing assembly equipped with the wireless sensor of any of the foregoing structures in accordance with the present invention, the sensor (6A to 6E) may be preferably disposed within a sealed space in the bearing assembly, which is shielded from the outside, and the electric power receiver (8, 8A, 8B) and the sensor signal transmitter (9, 9A, 9B) may then be disposed outside the bearing. The sealed space is, for example, an annular bearing space defined between an outer race and an inner race of a rolling bearing and sealed at opposite open ends by sealing members. Where the bearing is a wheel support bearing, the sealed bearing space is defined between an inner member (2) and an outer member (1).

Where the sensors (6A to 6E) are accommodated within the sealed space of the bearing assembly, the sensors (6A to 6E) can advantageously be protected from external dusts, foreign matter, water and so on and, therefore, the reliability and durability of the sensors (6A to 6E) can increase. In particular, where the bearing assembly is a wheel support bearing assembly (33), the bearing assembly is often placed under the severe environment where it is susceptible to foreign matter and/or salty muddy water on the roadway and, therefore, disposition of the sensors (6C to 6E) within the sealed space is effective to increase the reliability and durability thereof. The electric power receiver (8, 8A, 8B) and the sensor signal transmitter (9, 9A, 9B) are preferably disposed outside the bearing assembly in terms of wireless transmission efficiency.

According to a sixth aspect of the present invention, there is provided a wheel support bearing assembly (33) for rotatably supporting a vehicle wheel relative to a vehicle body structure, which includes an outer member (1) having a plurality of outer raceways, an inner member (2) having inner raceways aligned with the outer raceways, and a plurality of rows of rolling elements (3) interposed between the outer raceways and the inner raceways. This wheel support bearing assembly (33) also includes one of a plurality of wireless sensor units (4A, 4B) that is mounted on the wheel support bearing assembly (33). Each of the plural wireless sensor units (4A, 4B) includes a sensor (6A, 6B) for detecting a parameter to be detected, a sensor signal transmitter (9A, 9B) for transmitting wireless a sensor signal outputted from the sensor (6A, 6B), and an electric power receiver (8A, 8B) for receiving wireless an electric operating power required to drive the sensor (6A, 6B) and the sensor signal transmitter (9A, 9B). Also, those plural wireless sensor units (4A, 4B) operate to transmit the respective sensor signals to a common sensor signal receiver (13) through the corresponding sensor signal transmitters (9A, 9B) and also operate to receive the electric operating power wireless from a common electric power transmitter (12) through the electric power receiver (8A, 8B).

According to the sixth aspect of the present invention, while the supply of the electric power to the plural wireless sensor units (4A, 4B) and the transmission of the sensor signals from the plural wireless sensor units (4A, 4B) can be accomplished, not only can the wheel support bearing assembly (33) of a lightweight and compact structure be achieved, but the maintenance is also easy, and even when the bearing assembly is in a halted condition, the communication is possible.

The present invention in accordance with a seventh aspect thereof provides a wheel support bearing assembly (33) for rotatably supporting a vehicle wheel relative to a vehicle body structure, which includes an outer member (1) having a plurality of outer raceways, an inner member (2) having inner raceways aligned with the outer raceways, and a plurality of rows of rolling elements (3) interposed between the outer raceways and the inner raceways. In this wheel support bearing assembly (33), there are provided a plurality of sensors (6C to 6E) for detecting respective parameters to be detected, a sensor signal transmitter (9) for transmitting wireless sensor signals outputted from the respective sensors (6C to 6E), and an electric power receiver (8) for receiving wireless an electric operating power required to drive the sensors (6C to 6E) and the sensor signal transmitter (9).

According to the seventh aspect of the present invention, while the supply of the electric power to the plural sensors (6C to 6E) and the transmission of the sensor signals from the plural sensors (6C to 6E) can be accomplished, not only can the bearing assembly (33) of a lightweight and compact structure be achieved, but the maintenance is also easy, and even when the bearing assembly is in a halted condition, the communication is possible. Also, mounting of the plural sensors (6C to 6E) on the bearing allows not only the number of revolutions but also other parameters such as temperature, vibration, load, torque and/or pressure to be detected and, therefore, is effective to render the bearing assembly to be intelligent, thus upgrading the automobile control. In addition, based on bearing information such as temperature, the bearing assembly can be diagnosed to determine if it has any trouble. It is, however, to be noted that, similar effects brought about by the use of the plural sensors (6C to 6E) can be obtained even when the plural sensors (6C to 6E) are mounted on any bearing assemblies in general other than the wheel support bearing assembly discussed above.

In the wireless sensor system of the present invention, where one of the sensors (6A to 6E) is mounted on a wheel support bearing assembly, for example, where the wireless sensor system includes any of the wheel support bearing assemblies (33), a sensor signal receiver (13) for receiving a sensor signal transmitted from the sensor signal transmitter (9, 9A, 9B) in the wheel support bearing assembly (33), and an electric power transmitter (12) for transmitting wireless the electric operating power to the electric power receiver (8, 8A, 8B), the sensor signal receiver (13) and the electric power transmitter (12) may be disposed in a tire house (34a) of the vehicle body structure (34), where the wheel support bearing assembly (33) is installed, or may be disposed in a portion of the vehicle body structure (34), which is more distant from the tire house (34a) with respect to the wheel support bearing assembly (33). That portion more distant from the tire house (34a) with respect to the wheel support bearing assembly (33) is, for example, a dashboard or console, where instruments (EUC or the like) utilized to perform an electric control of the automotive vehicle are installed.

According to this aspect of the present invention, disposition of the sensor signal receiver (13) and the electric power transmitter (12) at that portion more distant from the tire house (34a) with respect to the wheel support bearing assembly (33) is effective to eliminate the use of any harness which would otherwise be required between the tire house (34a) and the wheel support bearing assembly (33) and, accordingly, not only can troubles such as breakage of the harness resulting from collision of stone be avoided, but also the wireless sensor system can be light-weighted. Also, where the sensor signal receiver (13) and the electric power transmitter (12) are disposed in the tire house (34a), the distance in which the wireless transmission is carried out can be set short and, therefore, the intensity of the electromagnetic waves can advantageously be reduced, resulting in minimized electric power consumption.

The wireless sensor system of the present invention according to one aspect thereof includes the plural sensors for detecting the respective parameters to be detected, the sensor signal transmitter for transmitting wireless the sensor signals outputted respectively from the sensors, the electric power receiver for receiving wireless the electric operating power required to drive the sensors and the sensor signal transmitter, the sensor signal receiver for receiving the sensor signals transmitted by the sensor signal transmitter, and the electric power transmitter for transmitting wireless the electric operating power to the electric power receiver. Accordingly, this wireless sensor system can be designed as a system, which is, while the supply of the electric power to the plural sensors and the transmission of the sensor signals from the plural sensors can be accomplished, a lightweight and compact structure. Also, the maintenance of the wireless senor system is easy and even when the bearing assembly is in a halted condition, the communication is possible at any time.

The wireless sensor system of the present invention according to another aspect thereof is so designed that the electric operating power can be supplied wireless by the common sensor signal receiving unit to the plural wireless sensor units and, accordingly, the supply of the electric operating power to the plural wireless sensor units and the transmission of the sensor signals can be accomplished with a simplified structure. In view of this, not only is the maintenance such as replacement of the battery eliminated substantially, but also the reduction of the weight and the possibility of the sensor operation, which does not depend on the operating statuses of the machine and equipments, in which the wireless sensor system of the present invention is installed, can be appreciated. Since the wireless sensor system is reduced in weight, the unbalance can advantageously be minimized particularly where the wireless sensor unit is fitted to a rotating element of the bearing.

Where the wireless sensor unit is used in association with a tire pressure sensor for detecting the tire pressure in an automotive vehicle, the use of any battery or a similar external power source can advantageously be eliminated, resulting in reduction of the cost, maintenance-free and increase of the wheel balance brought about by the reduction of the weight. Also, where the wireless sensor unit is used in association with the rotation sensor mounted on a wheel support bearing assembly for an automotive vehicle, the electric power can be supplied even during a halted condition of the vehicle wheel and, therefore, the number of revolutions can be detected even though the vehicle wheel is almost halted, enabling the running stability to be obtained by means of a highly sophisticated control such as a control of the ABS activation shortly before the automotive vehicle then running on a low frictional road surface is brought to a halt, and a traction control at the time of abrupt acceleration and at the time of an extremely low speed run.

With the bearing assembly equipped with the wireless sensor and the wheel support bearing assembly equipped with the wireless sensor, both developed in accordance with the present invention, advantages can be appreciated in that the bearing assembly is lightweight and compact in structure and, yet, substantially free of maintenance, in that even when the bearing assembly is in a halted condition, the communication is possible at any time while the supply of the electric power to the plural sensors and the transmission of the sensor signals from the plural sensors take place.

BRIEF DESCRIPTION OF THE DRAWINGS

In any event, the present invention will become more clearly understood from the following description of preferred embodiments thereof, when taken in conjunction with the accompanying drawings. However, the embodiments and the drawings are given only for the purpose of illustration and explanation, and are not to be taken as limiting the scope of the present invention in any way whatsoever, which scope is to be determined by the appended claims. In the accompanying drawings, like reference numerals are used to denote like parts throughout the several views, and:

BEST MODE FOR CARRYING OUT THE INVENTION

A first preferred embodiment of the present invention will now be described with particular reference to FIG. 1. As shown therein, a wireless sensor system of the present invention includes a plurality of, for example, two, wireless sensor units 4A and 4B and a common sensor signal receiving unit 5 for supplying an electric power wireless to each of the wireless sensor units 4A and 4B and also for receiving a sensor signal transmitted from each of those wireless sensor units 4A and 4B. It is to be noted that the number of the wireless sensor units that can be employed in the practice of the present invention is not particularly limited to two as shown.

Each of the sensor units 4A and 4B includes a sensor 6A or 6B, which serves as a means for detecting a target parameter to be detected, and a receiver-transmitter subunit 7A or 7B, which in turn includes an electric power receiver 8A or 8B and a sensor signal transmitter 9A or 9B.

Figure 2:
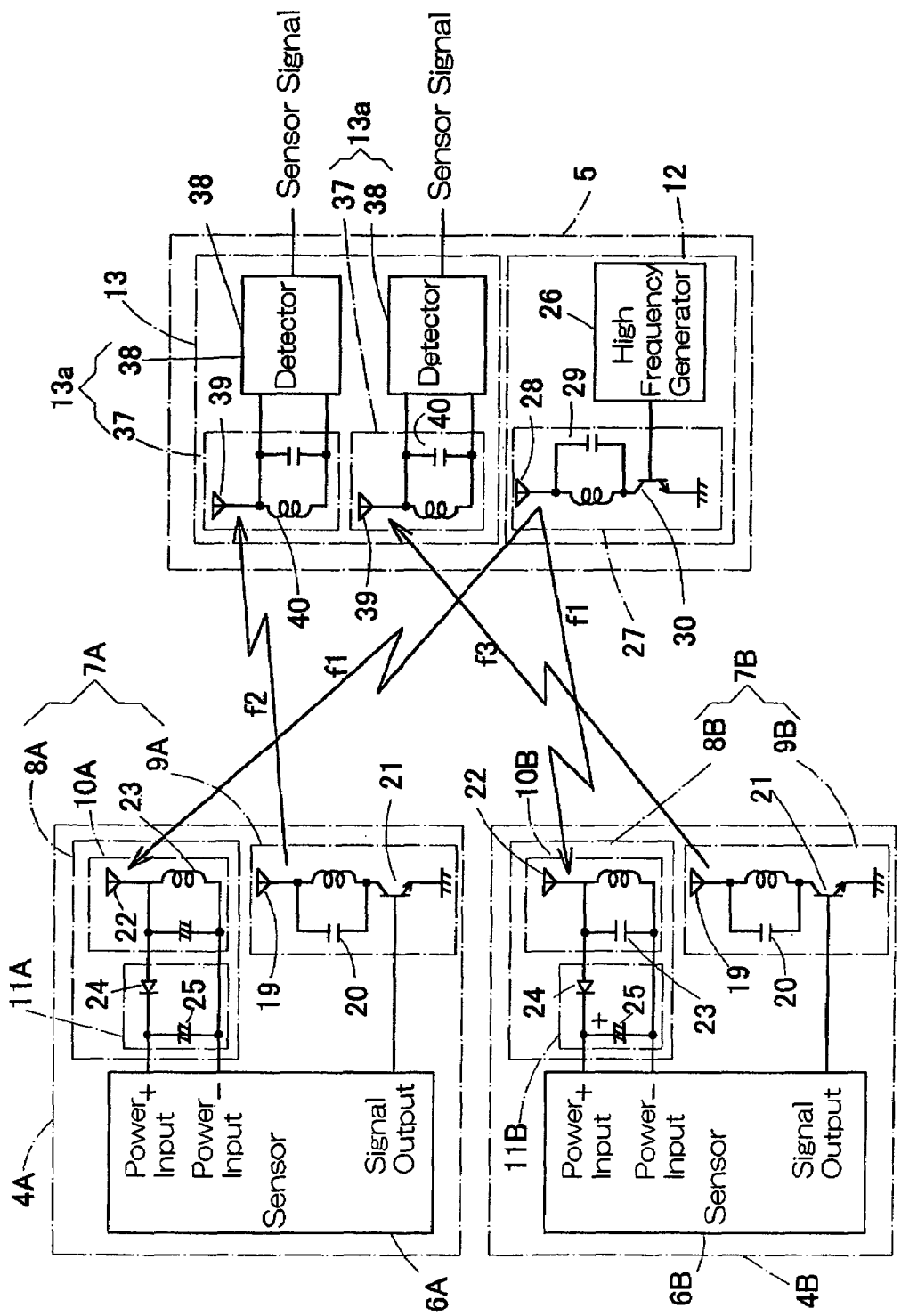
FIG. 2 is a circuit block diagram showing the wireless sensor system shown in FIG. 1.

As shown in FIG. 2, each of the electric power receivers 8A and 8B defines a means including a tuning circuit 10A or 10B and a detecting and rectifying circuit 11A or 11B for processing an electromagnetic wave of a predetermined power feeding frequency f1 to provide an electric operating power. The electric operating powers from the respective electric power receivers 8A and 8B are utilized to electrically drive the sensors 6A and 6B and the sensor signal transmitters 9A and 9B, respectively. Each of the electric power receivers 8A and 8B is constructed of the tuning circuit 10A or 10B including an antenna 22 and an LC circuit 23, and the detecting and rectifying circuit 11A or 11B including a diode 24 and a capacitor 25.

Each of the sensor signal transmitters 9A and 9B defines a means for transmitting a signal, outputted from the sensor 6A or 6B, in the form of an electromagnetic wireless sensor signal of a natural frequency f2 or f3 different from the power feeding frequency f1 and includes an antenna 19, an LC circuit 20 and a semiconductor switching element 21.

The common sensor signal receiving unit 5 includes an electric power transmitter 12 for transmitting the electromagnetic wave of the predetermined power feeding frequency f1, and a sensor signal receiver 13 for receiving the wireless sensor signals of the natural frequencies f2 and f3 that are transmitted respectively from the wireless sensor units 4A and 4B. The electric power transmitter 12 includes a high frequency generator 26 and a transmitting circuit 27. The transmitting circuit 27 includes an antenna 28, an LC circuit 29 and a semiconductor switching element 30.

The sensor signal receiver 13 of the common sensor signal receiving unit 5 includes receiving circuits 13a equal in number to and operatively associated with the respective wireless sensor units 4A and 4B. Each of the receiving circuits 13a of the sensor signal receiver 13 is a circuit for receiving a signal of a single frequency corresponding to the natural frequency f2 or f3 that is transmitted from the wireless sensor units 4A or 4B, and includes a tuning circuit 37 and a detecting circuit 38. The tuning circuit 37 in turn includes an antenna 30 and an LC circuit 40.

The plane of polarization of the power feeding electromagnetic wave that is transmitted from the sensor signal receiving unit 5 differs from that of the electromagnetic waves of the sensor signals transmitted from the respective wireless sensor units 4A and 4B. The use of the different planes of polarization in addition to the use of the different frequencies is effective to avoid any possible interference of the power feeding electromagnetic wave with the electromagnetic waves of the sensor signals to thereby enhance the signal separation. Also, the respective electromagnetic waves of the sensor signals transmitted from the wireless sensor units 4A and 4B have respective planes of polarization that are different from each other, so that any possible interference between the electromagnetic waves of the sensor signals can be avoided to enhance the signal separation.

With the wireless sensor system so constructed as hereinabove described, an electric operating power required for each of the wireless sensor units 4A and 4B can be supplied wireless and, accordingly, neither the battery nor an electric power generator for providing an electric power necessary to feed the sensor units 4A and 4B is required, resulting in the wireless sensor system to be assembled compact and lightweight. In addition, no routine battery replacement is required and, hence, the maintenance of the wireless sensor system can be facilitated. Yet, since both the wireless supply of the electric power to each of the wireless sensor units 4A and 4B and receipt of the wireless sensor signal from each of the wireless sensor units 4A and 4B are accomplished with the common sensor signal receiving unit 5, the wireless sensor system as a whole can advantageously be simplified in structure.

Figure 3:
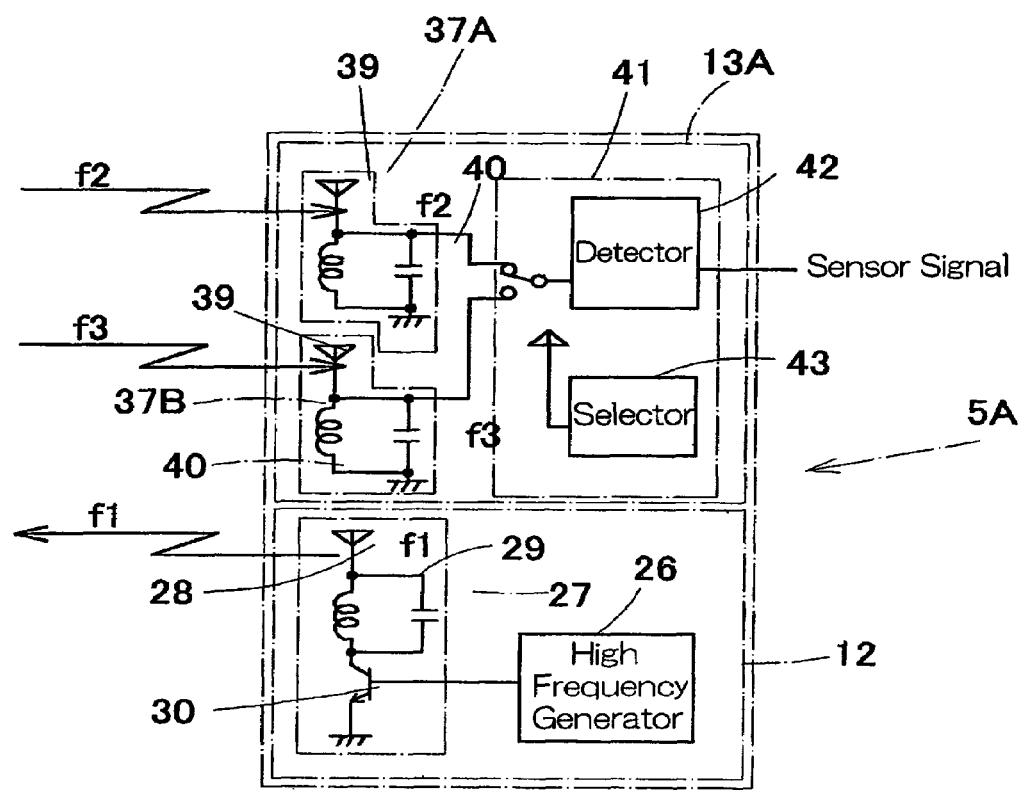
FIG. 3 is a circuit block diagram of a sensor signal receiving unit employed in the wireless sensor system according to a second preferred embodiment of the present invention.

FIG. 3 illustrates the wireless sensor system according to a second preferred embodiment of the present invention, in which a different sensor signal receiving unit 5A is employed in place of the sensor signal receiving unit 5 discussed above. In the practice of this second preferred embodiment of the present invention, the sensor signal receiving unit 5A cooperates with one or more wireless sensor units which are identical to the wireless sensor units 4A and 4B shown in FIG. 1.

Referring now to FIG. 2, the sensor signal receiving unit 5A includes a sensor signal receiver 13A made up of tuning circuits 37A and 37B, each capable of receiving a signal of a single frequency corresponding to the natural frequency f2 or f3 transmitted from the corresponding wireless sensor units 4A or 4B (FIG. 2), and a common switching detector 41 for switching between outputs of the tuning circuits 37A and 37B to select the outputs one at a time on a time sharing basis and for detecting each of the selected outputs. The switching detector 41 includes a detecting element (detector) 42 and a switching element (selector) 43 for switching the tuning circuits 37A and 37B, one at a time on a time sharing basis, to connect them to the detecting element 42.

Other structural features of the wireless sensor receiving unit 5A employed in the wireless sensor system according to the second embodiment of the present invention are similar to the wireless sensor receiving unit 5 employed in the wireless sensor system according to the first embodiment and, therefore, the details thereof are not reiterated for the sake of brevity.

In this second embodiment, when the switching element 43 of the switching detector 41 connects the tuning circuit 37A to the detecting element 42, the detecting element 42 detects a signal of the frequency f2 which is fed wireless to the tuning circuit 37A from the wireless sensor unit 4A for detecting the number of revolutions. On the other hand, when the switching element 43 connects the tuning circuit 37B to the detecting element 42, the detecting element 42 detects a signal of the frequency f3 which is fed wireless to the tuning circuit 37B from the wireless sensor unit 4B for detecting the number of revolutions.

According to the second embodiment shown in and described with reference to FIG. 3, the respective electromagnetic waves of the natural frequencies f2 and f3 transmitted wireless from the associated wireless sensor units 4A and 4B can be discriminately detected by the single detecting element 42 in the sensor signal receiving unit 5A, the sensor signal receiving unit 5A can have a simplified structure even where the number of the wireless sensor units used is large.

It is to be noted that in the second embodiment of the present invention a single variable tuning circuit capable of varying to tune to each of the natural frequencies f2 and f3 transmitted respectively from the wireless sensor units 4A and 4B (FIG. 2) may be employed in place of the plural tuning circuits 37A and 37B. In such case, the sensor signal receiver 13A should be so configured that the switching element can switch among varying natural frequencies of the tuning circuit to select the varying natural frequencies one at a time on a time sharing basis, and that the detecting element 42 can then detect each of the selected natural frequencies.

Figure 4:
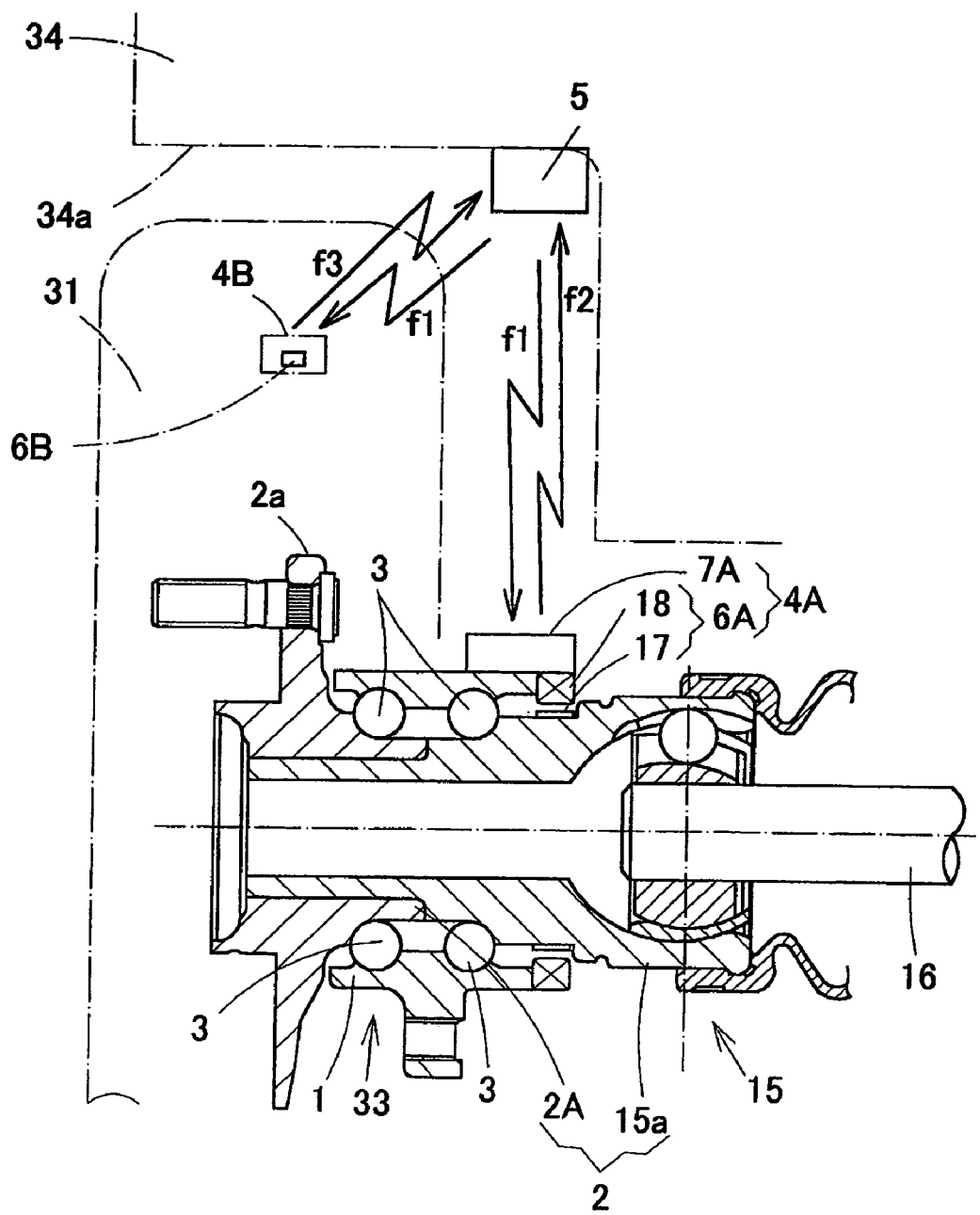
FIG. 4 is a schematic longitudinal sectional view of a wheel support bearing assembly equipped with the wireless sensor system according to any one of the first and second preferred embodiments of the present invention.

An application of the wireless sensor system according to the present invention to an automotive vehicle will now be described with particular reference to FIGS. 4 and 5. In this application, the wireless sensor system is utilized for detecting the tire pressure and the number of revolutions of the vehicle wheel. As shown in FIG. 4, the wheel 31 shown by the phantom line is rotatably supported by a vehicle body structure 34 by means of a wheel support bearing assembly 33. The wheel support bearing assembly 33 includes an outer member 1 supporting the wheel 31 and an rotatable inner member 2, with circumferentially extending rows of rolling elements 3 interposed between the outer member 1 and the inner member 2.

The outer member 1 is supported by a wheel suspension, extending downwardly from the vehicle body structure 34, through a knuckle (not shown). On the other hand, the inner member 2 is made up of a hub axle 2A, which has one end formed integrally with a wheel mounting flange 2a extending radially outwardly therefrom, and an outer race 15a forming a part of a constant velocity universal joint 15, with the vehicle wheel 31 fitted to the wheel mounting flange 2a of the hub axle 2A. This inner member 2 is coupled with an axle 16 through the constant velocity universal joint 15.

An annular bearing space delimited between the outer member 1 and the inner member 2 has one of its opposite annular open ends provided with the wireless sensor unit 4A for detecting the number of revolutions of the vehicle wheel 31. On the other hand, the wireless sensor unit 4B is carried by the vehicle wheel 31 to detect the tire pressure. The sensor signal receiving unit 5 for supplying wireless the electric power to the wireless sensor units 4A and 4B and for receiving respective sensor signals transmitted wireless from the wireless sensor units 4A and 4B is fixedly secured to a portion of the vehicle body structure 34, for example, to a tire house 34a. It is to be noted that the sensor signal receiving unit 5 is of the structure shown in and described with reference to any one of FIGS. 1 and 2.

The sensor 6A of FIG. 4 used as a rotation sensor includes a magnetic encoder 17 mounted on the inner member 2 and a magnetic sensor 18 mounted on the outer member 1 in fact-to-face relation with the magnetic encoder 17. The magnetic encoder 17 is a ring-shaped multipolar magnet, which is a ferrite magnet, a rare earth rubber magnet, a plastic magnet or a sintered magnet and has opposite magnetic poles N and S alternating in a direction circumferentially thereof. The magnetic sensor 18 is a magnetoresistive sensor, that is, a sensor utilizing a magnetoresistive element (also referred to as "MR element") and is operable to detect change in polarity of the magnetic encoder 17 as the vehicle wheel 31 rotates and then to output an incremental pulse signal as a sensor signal indicative of the number of revolutions of the vehicle wheel 31.

It is to be noted that the magnetic sensor 18 may not be always limited to the magnetoresistive sensor, but a Hall effect sensor, an M1 sensor or a flux-gate magnetic sensor may be equally employed therefor.

When the rotation sensor is made up of the multipolar magnet and the magnetic sensor, it is possible to provide a compact rotation sensor having a high resolution. Also, if the magnetic sensor of the magnetoresistive type has a sensor element having a high resistance, the electric power consumption can be minimized and, therefore, it is preferable to combine such magnetic sensor with a wireless power feeding system having a low power feeding efficiency as compared with that of the wired system.

Figure 5:
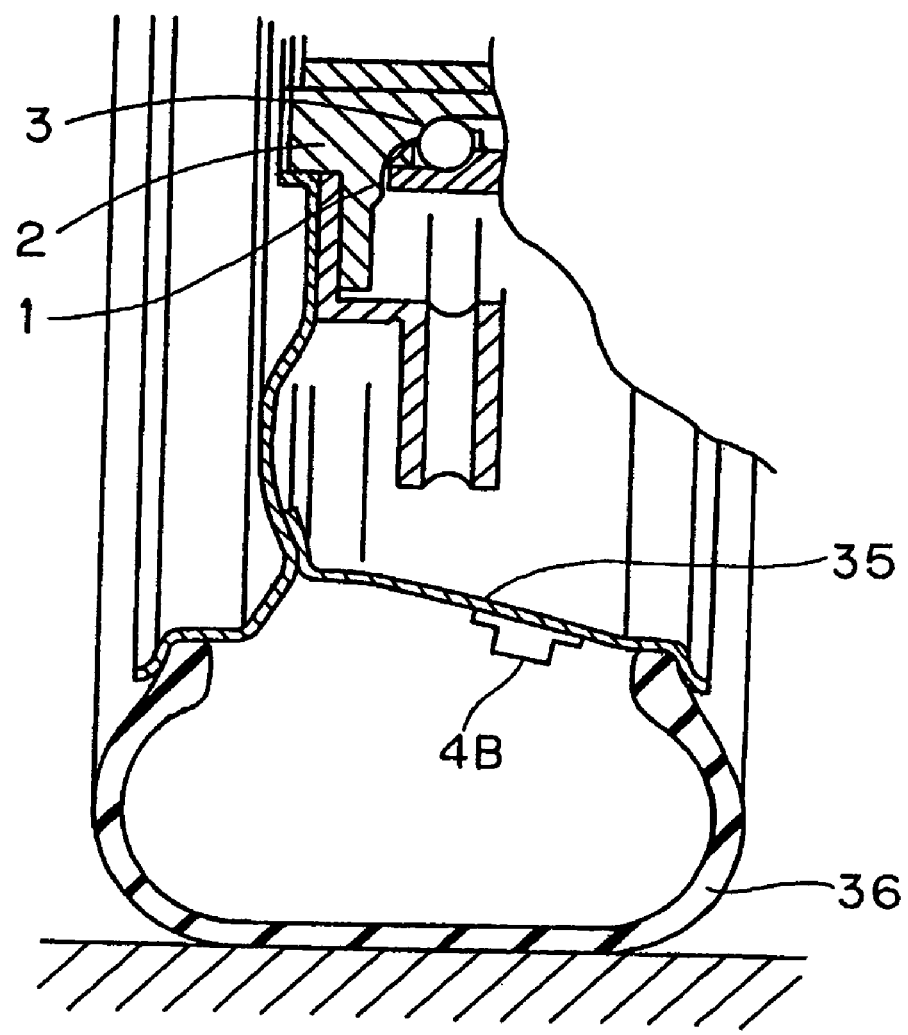
FIG. 5 is a longitudinal sectional view showing a portion of an automobile wheel in which a wireless sensor unit of the wireless sensor system according to any one of the first and second preferred embodiments of the present invention is incorporated for transmitting a sensor signal indicative of the tire pressure.

The wireless sensor unit 4B of FIGS. 4 and 5 for detecting the tire pressure is secured to a portion of a tire wheel 35 that confronts the interior of a wheel tire 36 mounted on the vehicle wheel. The sensor 6B of this wireless sensor unit 4B serves to detect the tire pressure of the wheel tire 36.

The operation of the wireless sensor system will now be described. The power feeding electromagnetic wave that is transmitted from the electric power transmitter 12 (FIG. 1) of the sensor signal receiving unit 5 mounted on the vehicle body structure 34 is received and rectified by the electric power receivers 8A and 8B of the wireless sensor units 4A and 4B, respectively, to provide an electric operating power with which the wireless sensor units 4A and 4B can be electrically powered.

The sensor 6A of the wireless sensor unit 4A mounted on the wheel support bearing assembly 33 detects the number of revolutions of the vehicle wheel 31. More specifically, change in polarity of the magnetic encoder 17 on the inner member 2 incident to rotation of the vehicle wheel 31 is detected by the magnetic sensor 18, from which the sensor signal is subsequently outputted in the form of the incremental pulse signal. This sensor signal indicative of the number of revolutions of the vehicle wheel 31 is transmitted wireless from the sensor signal transmitter 9A by means of the electromagnetic wave of the frequency f2 as a carrier wave. One of the receiving circuits 13a of the sensor signal receiver 13 of the sensor signal receiving unit 5, which is operatively associated with the wireless sensor unit 4A, receives and detects this electromagnetic wave transmitted from the sensor signal transmitter 9A and then outputs the sensor signal indicative of the number of revolutions of the vehicle wheel 31.

On the other hand, the sensor 6B of the wireless sensor unit 4B carried by the vehicle wheel 31 detects the tire pressure of the wheel tire 36. The sensor signal indicative of the tire pressure is transmitted wireless from the sensor signal transmitter 9B by means of the electromagnetic wave of the frequency f3 as a carrier wave. The other of the receiving circuits 13a of the sensor signal receiver 13 of the sensor signal receiving unit 5, which is operatively associated with the wireless sensor unit 4B, receives and detects this electromagnetic wave transmitted from the sensor signal transmitter 9B and then outputs the sensor signal indicative of the tire pressure.

As hereinabove described, with the wireless sensor system of the present invention, not only can the electric power be supplied wireless in the form of the electromagnetic wave from the sensor signal receiving unit 5, mounted on the vehicle body structure 34, to each of the wireless sensor units 4A and 4B, but the sensor signal receiving unit 5 can also receive the different sensor signal transmitted wireless in the form of the electromagnetic wave from each of the wireless sensor units 4A and 4B. Accordingly, the wireless sensor system of the present invention is substantially free from the problem associated with battery shutoff that is inevitable in the conventional sensor system where a battery is used as a source of an electric power. Also, detection results such as the tire pressure and the number of revolution of the vehicle wheel can be assuredly transmitted in the form of a wireless signal and the respective sensors 6A and 6B in the wireless sensor units 4A and 4B can be assembled compact and inexpensive. Elimination of the battery replacement accomplished by the present invention makes it easy to carry out the maintenance of the wireless sensor system.

Since the wireless sensor unit 4A for the detection of the number of revolutions, in which the magnetic sensor 18 forms a part of the sensor 6A, is not of a self-generating type, that is, a type capable of generating the electric operating power as the vehicle wheel 31 rotates, detection of the number of revolutions is possible even when the vehicle wheel rotates at a speed approximating to a halt, and the running stability can be obtained by means of a highly sophisticated control such as a control of the ABS activation shortly before the automotive vehicle then running on a low frictional road surface is brought to a halt, and a traction control at the time of abrupt acceleration and at the time of an extremely low speed run.

Also, since the wireless sensor unit 4B for the detection of the tire pressure does not require the use of any battery, the weight of the unit 4B can advantageously be reduced correspondingly, allowing the wheel balance to be secured.

Figure 6:
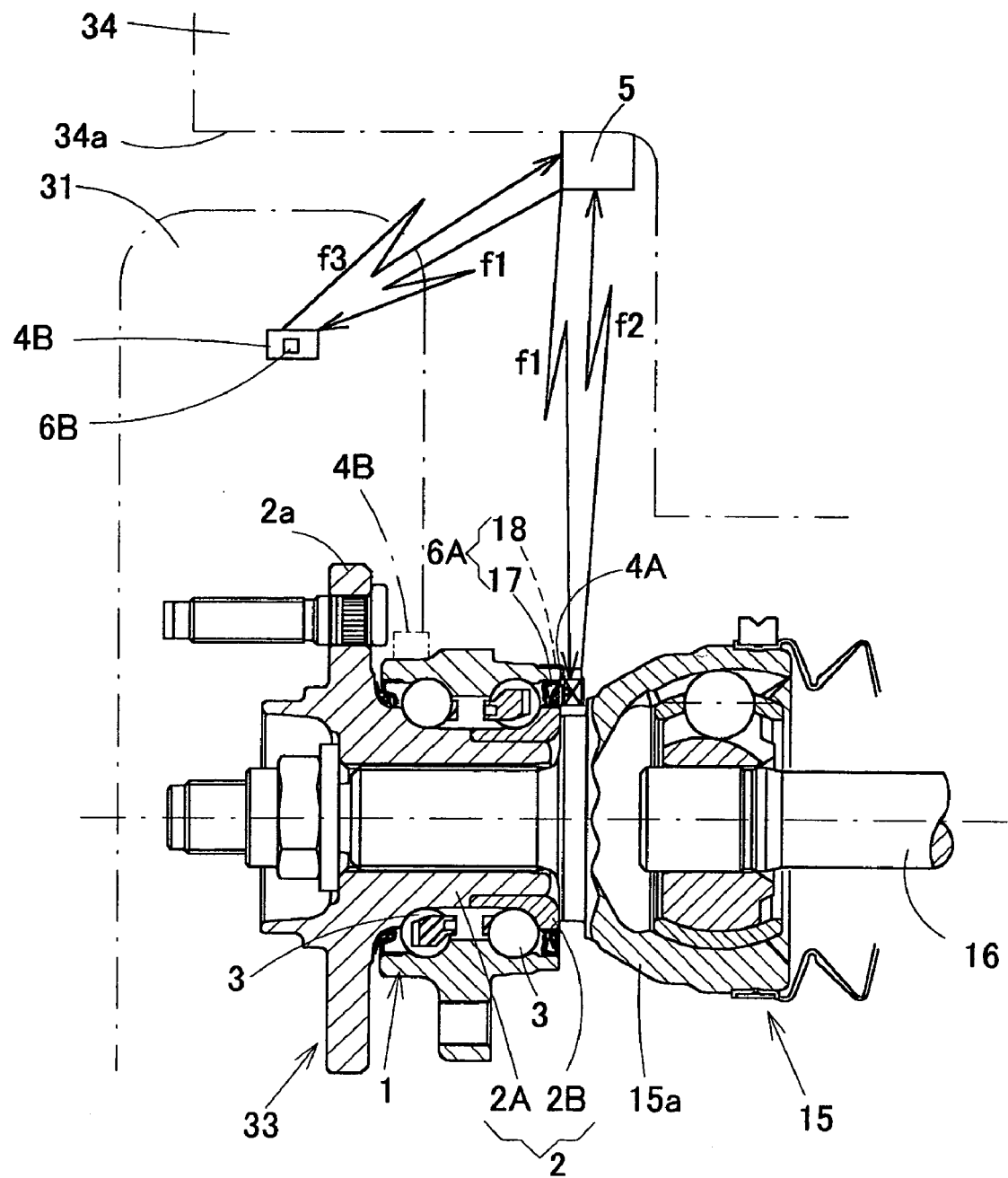
FIG. 6 is a schematic longitudinal sectional view of the wheel support bearing assembly equipped with the wireless sensor system, showing a modification thereof.

It is to be noted that although the wheel support bearing assembly 33 shown in FIG. 4 is of a fourth generation type, the present invention can be equally applied to the wheel support bearing assembly of any generation type, for example, the wheel support bearing assembly of a third generation type such as shown in FIG. 6. In the modification shown in FIG. 6, the inner member 2 is comprised of a hub axle 2A and an inner race 2B fixedly mounted externally on one end of the hub axle 2A, and inner raceways are defined on respective outer peripheral surfaces of the hub axle 2A and the inner race 2B, respectively. Outer raceways aligned with the respective inner raceways are defined on an inner peripheral surface of the outer member 1. The hub axle 2A is coupled with an axle fitted into an outer race 15a of the constant velocity universal joint 15 and the inner member 2 is then coupled with the outer race 1 5a of the constant velocity universal joint 15.

The sensor (the rotation sensor) 6A of the wireless sensor unit 4A is made up of the magnetic encoder 17 mounted on the inner member 2 and the magnetic sensor 18 mounted on the outer member 1 in face-to-face relation with the magnetic encoder 17. The magnetic encoder 17 is mounted on a slinger, which forms a part of a sealing device mounted on the inner member 2. Other structural features of the wheel support bearing assembly shown in FIG. 6 than those described above are similar to those shown in and described in connection with the previous embodiment with reference to FIGS. 4 and 5.

It is to be noted that in the wheel support bearing assembly 33 shown in any one of FIGS. 4 and 6, the wireless sensor units 4A and 4B may be arranged on the outer member 1 of the wheel support bearing assembly 33 as shown by the dotted line in FIG. 6. In such case, one of the wireless sensor units, for example, the wireless sensor unit 4A may make use of the rotational sensor as the sensor 6A and the other of the wireless sensor units, that is, the wireless sensor unit 4B may make use of a temperature sensor or a vibration sensor as the sensor 6B.

Figure 7:
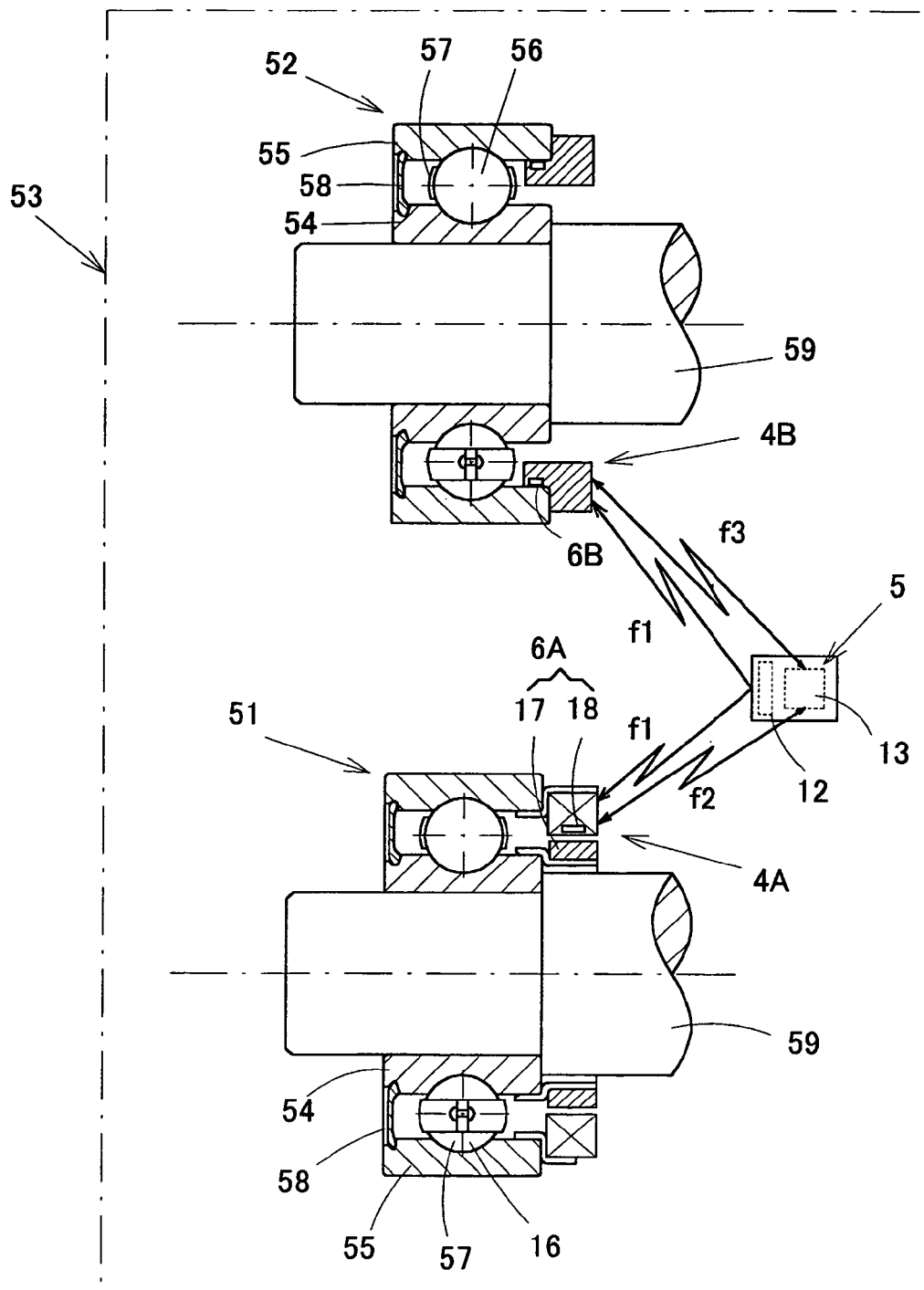
FIG. 7 is a schematic sectional diagram showing an equipment equipped with the wireless sensor system according to a third preferred embodiment of the present invention.

FIG. 7 illustrates a third preferred embodiment of the present invention. In this embodiment, the present invention is applied to a machine plant 53 including a plurality of, for example, two rolling bearings 51 and 52. The bearings 51 and 52 are provided with the respective wireless sensor units 4A and 4B of FIGS. 1 and 2. The machine plant 53 may be, for example, a conveyor line including roller conveyors or belt conveyors, in which rotary shafts 59 for driving transport rollers or belt drive rollers are rotatably supported by the rolling bearings 51 and 52, respectively.

Each of the rolling bearings 51 and 52 includes an inner race 54, an outer race 55, a row of rolling elements 56 retained by a roller retainer 57 and rollingly interposed between the inner and outer races 54 and 55, and a sealing member 58. The bearings 51 and 52 are a deep groove ball bearing.

The wireless sensor unit 4A mounted on the rolling bearing 51 is used for detecting the number of revolutions and the sensor 6A of the wireless sensor unit 4A includes the magnetic encoder 17 mounted on the inner race 54 and the magnetic sensor 18 mounted on the outer race 55 in face-to-face relation with the magnetic encoder 17. On the other hand, the wireless sensor unit 4B mounted on the rolling bearing 52 includes the sensor 6B used to detect a parameter such as the temperature or the vibration.

The sensor signal receiving unit 5 is installed at a suitable place within the machine plant 53, where the sensor signal receiving unit 5 receives the sensor signals from the wireless sensor units 4A and 4B and transmits the electric operating power to the wireless sensor units 4A and 4B. Unless otherwise specified, this third embodiment is substantially similar in structure to the embodiment shown in and described with reference to FIGS. 1 and 2.

According to the third embodiment, the respective sensor signals outputted from the wireless sensor units 4A and 4B, which are mounted on the associated rolling bearings 51 and 52 within the machine plant 53, are received by the common sensor signal receiving unit 5 and, concurrently, the electric operating power required to drive the wireless sensor units 4A and 4B can be supplied wireless from the common sensor signal receiving unit 5 to the wireless sensor units 4A and 4B.

It is to be noted that although in the embodiment shown in FIG. 7 reference has been made to the use of the two wireless sensor units 4A and 4B, the machine plant 53 may include three or more rolling bearings each incorporated with the respective wireless sensor unit so that the wireless sensor units can interface with the common sensor signal receiving unit 5 in a manner similar to that described hereinabove.

Figure 8:
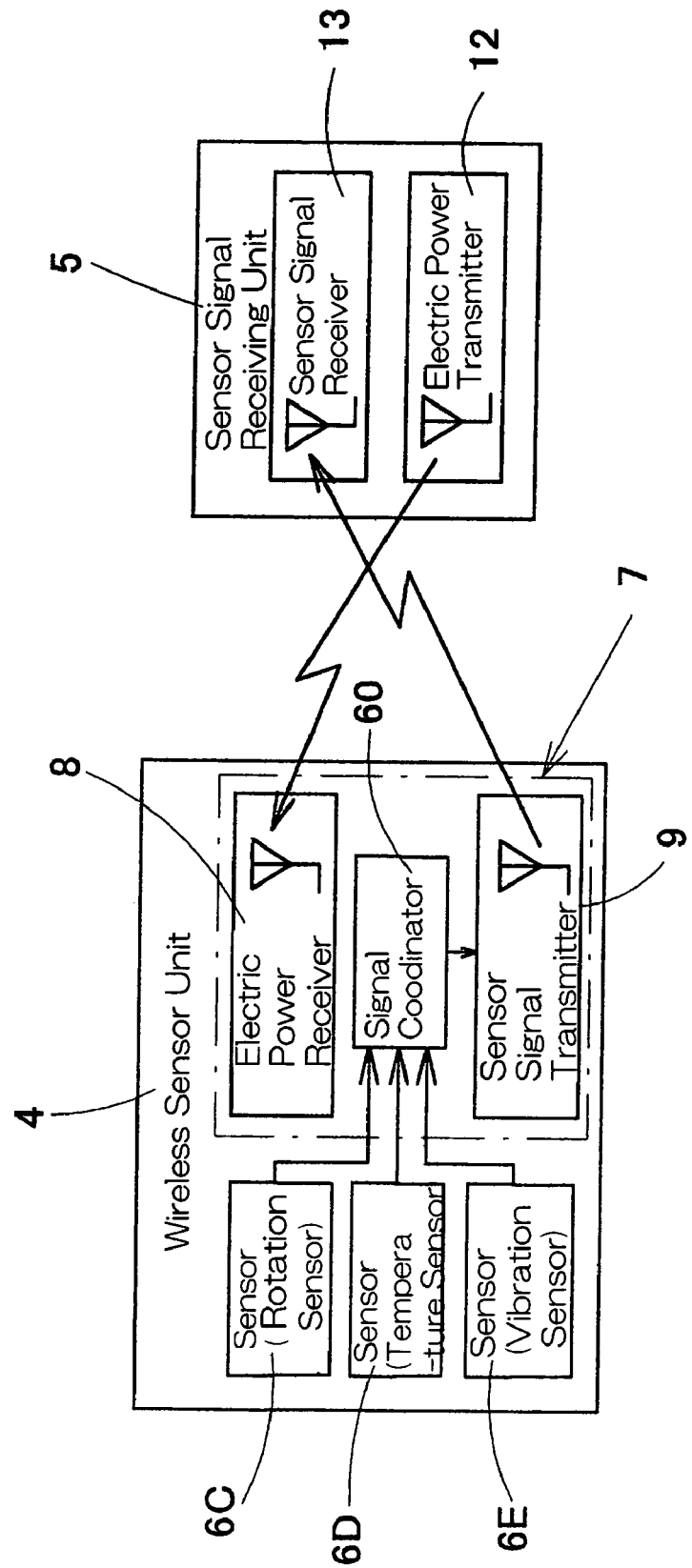
FIG. 8 is a block diagram showing the wireless sensor system according to a fourth preferred embodiment of the present invention.

FIG. 8 illustrates the wireless sensory system according to a fourth preferred embodiment of the present invention. The wireless sensor system of FIG. 8 includes a single wireless sensor unit 4 having a plurality of, for example, three sensors 6C to 6E incorporated therein. Specifically, the wireless sensor unit 4 includes the plural sensors 6C to 6E, a sensor signal transmitter 9 and an electric power receiver 8.

The sensor signal transmitter 9 transmits wireless respective sensor signals from the sensors 6C to 6E to the common sensor signal receiving unit 5. The respective outputs of the sensors 6C to 6E are processed by a signal coordinator 60 so that they can be transmitted to the common sensor signal receiving unit 5 by the sensor signal transmitter 9. The signal coordinator 60 may be of any suitable circuit so designed that the sensor signals from the sensors 6C to 6E can be processed so as to be discriminately received by the common sensor signal receiving unit 5, and may, for example, be so designed that the sensor signals from the sensors 6C to 6E can be supplied to the sensor signal transmitter 9 on a time-shared basis. Alternatively, the signal coordinator 60 may be of a type capable of superimposing the respective sensor signals from the sensors 6C to 6E.

The electric power receiver 8 in the wireless sensor unit 4 supplies an electric power, received wireless from the common sensor signal receiving unit 5, to the sensors 6C to 6E, the sensor signal transmitter 9 and the signal coordinator 60. The sensor signal transmitter 9, the electric power receiver 8 and the signal coordinator 60 altogether constitute a receiver-transmitter subunit 7. It is to be noted that the signal coordinator 60 may be either incorporated in the sensor signal transmitter 9 or separate from the sensor signal transmitter 9.

The sensor signal receiving unit 5 includes a sensor signal receiver 13 for receiving the sensor signal transmitted from the sensor signal transmitter 9 of the wireless sensor unit 4, and an electric power transmitter 12 for transmitting an electric power wireless to the electric power receiver 8 of the wireless sensor unit 4. The sensor signal receiver 13 is capable of discriminately receiving the respective sensor signals, outputted from the sensors 6C to 6E and transmitted through the sensor signal transmitter 9, in dependence on a processing scheme of the signal coordinator 60. Transmission of the signals between the sensor signal transmitter 9 and the sensor signal receiver 13 and transmission of the electric power between the electric power transmitter 12 and the electric power receiver 8 are carried out wireless by means of, for example, electromagnetic waves.

It is to be noted that the sensors 6C to 6E may be utilized either to detect the same parameters, for example, the temperatures or to detect different parameters, for example, the number of revolutions, the temperature and the vibration.

Figure 1:
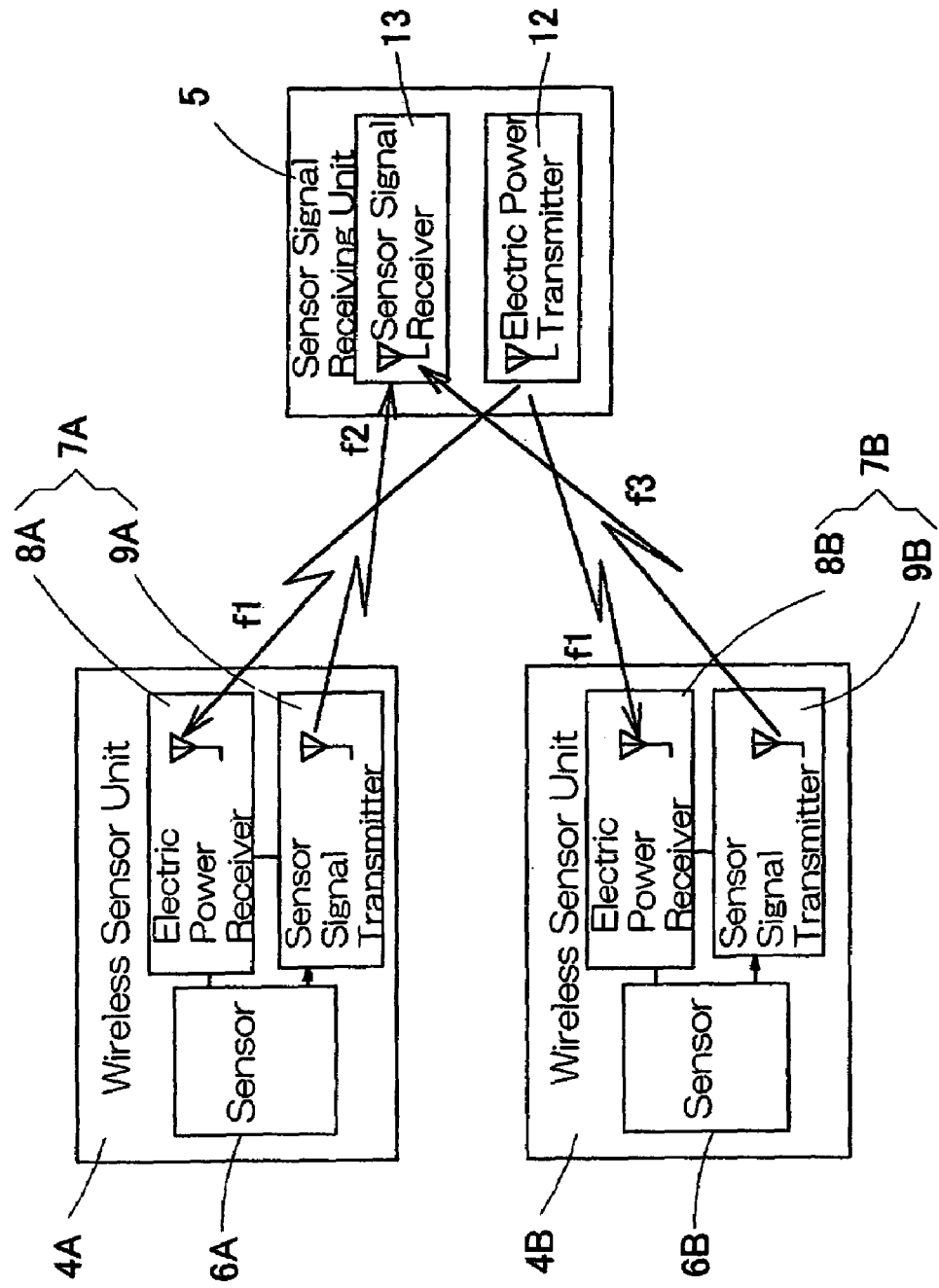
FIG. 1 is a block diagram showing a wireless sensor system according to a first embodiment of the present invention.

It is also to be noted that one of the wireless sensor units 4A and 4B employed in the first embodiment of the present invention shown in FIG. 1 may be of a design including the plural sensors 6C to 6E shown in FIG. 8. In such case, the use is preferred of the signal coordinator 60.

Figure 9:
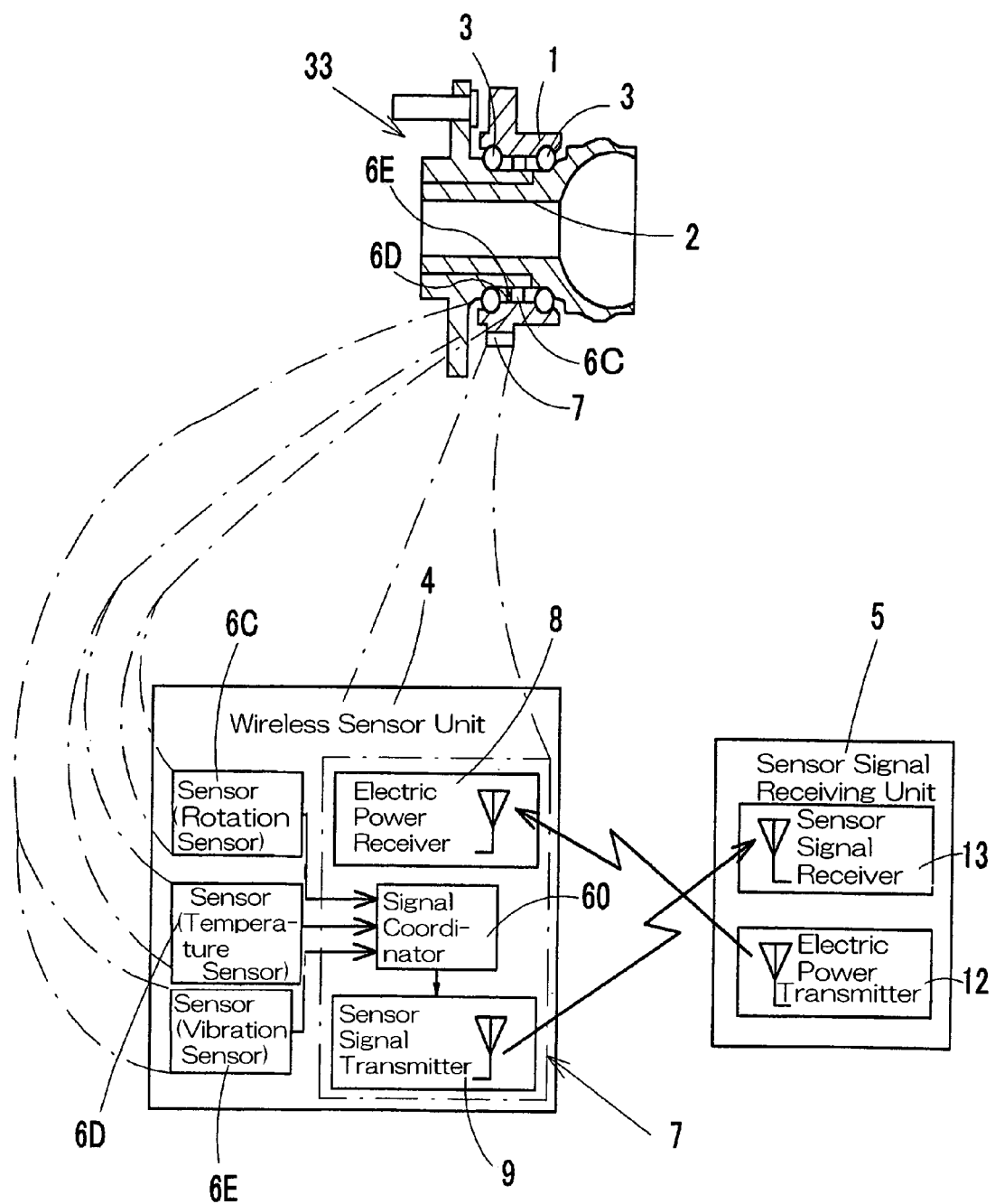
FIG. 9 is a block diagram of the wireless sensor system shown in FIG. 8, shown together with the wheel support bearing assembly to which it is applied.

A conceptual application of the wireless sensor system according to the fourth embodiment of FIG. 8 to the wheel support bearing assembly is shown in FIG. 9. In this application, the plural sensors 6C to 6E are used to detect the number of revolutions, the temperature and the vibration, respectively. The receiver-transmitter subunit 7, the temperature sensor 6D and the vibration sensor 6E are mounted on the outer member 1 of the wheel support bearing assembly. The rotation sensor 6C is mounted on the outer member 1 so that the number of revolutions of the inner member 2 can be detected. The sensor signal receiving unit 5 is disposed inside a tire house (not shown).

According to the conceptual application of FIG. 9, the mounting of the single wireless sensor unit 4 on the wheel support bearing assembly 33 allows the detections of the number of revolutions, the temperature and the vibrations simultaneously. Also, the electric power can be supplied wireless to the wireless sensor unit 4 and, for this reason, a harness, which would otherwise extend between the tire house and the wheel support bearing assembly, can advantageously be dispensed with and, accordingly, not only can troubles such as breakage of the harness resulting from collision of stones be avoided, but also the wireless sensor unit 4 can be light-weighted. Also, the use of the plural sensors 6C to 6D is effective to render the bearing assembly to be functionally intelligent, thus upgrading the automobile control. In addition, based on bearing information such as temperature, the bearing assembly can be diagnosed to determine if it has any trouble.

Figure 10:
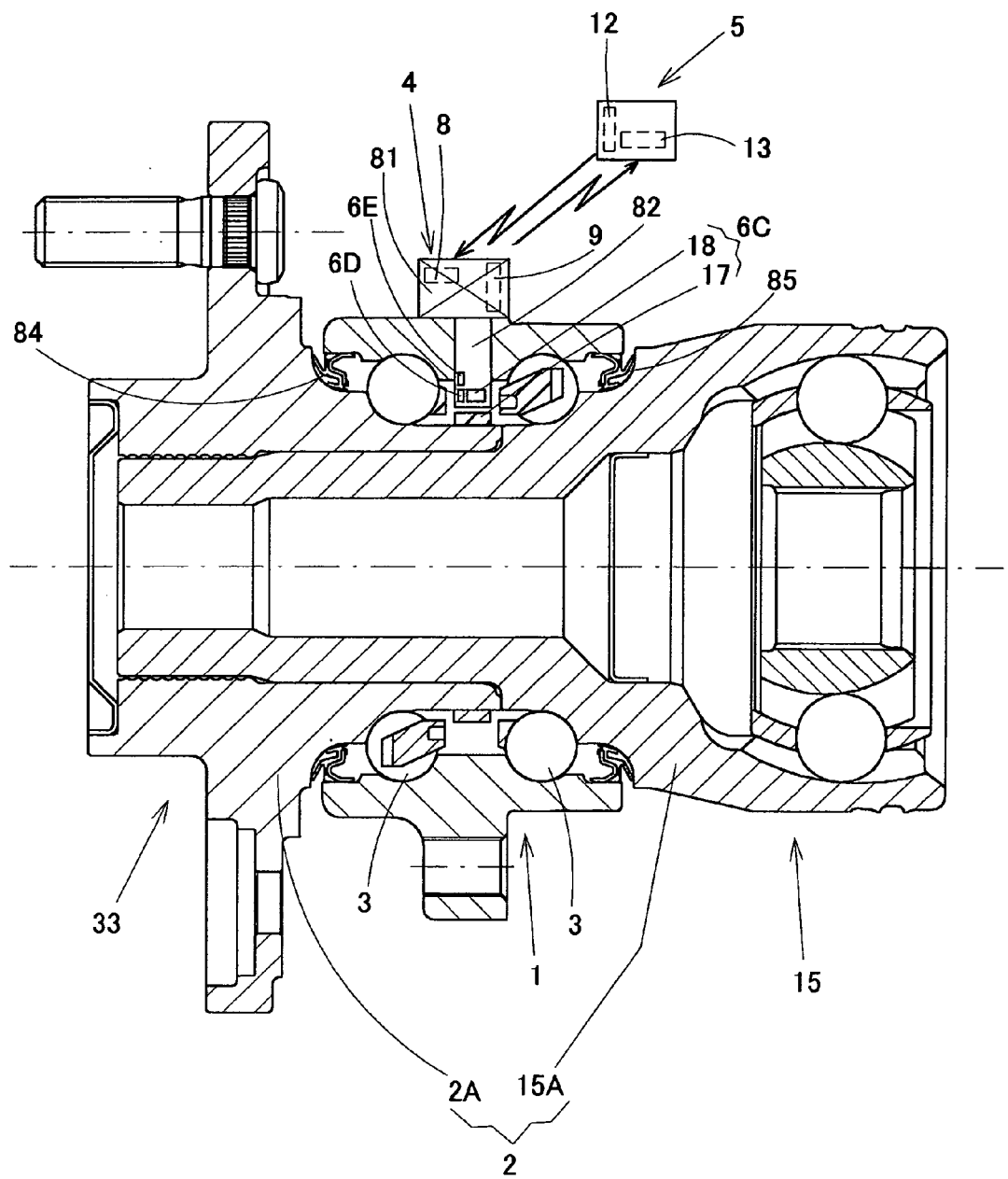
FIG. 10 is a longitudinal sectional view showing the details of the wheel support bearing assembly of FIG. 9.

The details of the wheel support bearing assembly of FIG. 9 are shown in FIG. 10. The wheel support bearing assembly 33 shown therein is of a fourth generation type and includes the inner member 2 made up of a hub axle 2A and an outer race 15A of the constant velocity universal joint 15. Raceways each for the respective row of the rolling elements 3 are formed on an outer peripheral surface of the hub axle 2A and an outer peripheral surface of the outer race 15A.

The single wireless sensor unit 4 is mounted on the outer member 1 of the wheel support bearing assembly 33. The sensors 6C to 6E of the wireless sensor unit 4 are disposed within a sealed space in the wheel support bearing assembly 33, which is shielded from the outside, whereas the electric power receiver 8 and the sensor signal transmitter 9 are mounted externally on the outer race 1. More specifically, the wireless sensor unit 4 forms an integral unit, in which a circuit box 81 and a sensor mount 82 are integrated together, and the circuit box 81 is mounted on an outer peripheral surface of the outer member 1. The sensor mount 82 is accommodated within an annular bearing space between the outer member 1 and the inner member 2, having been inserted through a radial hole formed in the outer member 1.

The electric power receiver 8 and the sensor signal transmitter 9 are disposed within the circuit box 81, and the sensors 6C to 6E are provided in the sensor mount 82. The rotation sensor 6C is made up of the magnetic sensor 18 and the magnetic encoder 17 disposed in face-to-face relation with the magnetic sensor 18, while the magnetic sensor 18 is disposed in the sensor mount 82. The magnetic encoder 17 is mounted on an outer peripheral surface of the inner member 2. This wheel support bearing assembly 33 also includes sealing members 84 and 85 for sealing opposite open ends of the annular bearing space delimited between the outer and inner members 1 and 2. The sensors 6C to 6E are positioned within this sealed bearing space and between the rows of the rolling elements 3.

As described above, since the sensors 6C to 6E are disposed within the sealed bearing space in the bearing assembly 33, the sensors 6C to 6E can be protected from external dusts, foreign matter, water and so on and, therefore, the reliability and durability of the sensors 6C and 6E can advantageously be increased. In particular, since the wheel support bearing assembly 33 is placed under the severe environment where it is susceptible to foreign matter and/or salty muddy water on the roadway, disposition of the sensors 6C to 6E within the sealed bearing space is effective to increase the reliability and durability thereof. The electric power receiver 8 and the sensor signal transmitter 9 are preferably disposed outside the wheel support bearing assembly 33 in terms of wireless transmission efficiency.

It is to be noted that although the wheel support bearing assembly 33 of FIG. 10 is a fourth generation type, the wheel support bearing assembly of any generation type, for example, the third generation type can be employed such that the sensors 6C to 6E may be disposed within the sealed bearing space while the electric power receiving unit 8 and the sensor signal transmitter 9 are disposed outside the wheel support bearing assembly. Also, the wireless sensor unit 4 may include either only one sensor or a plurality of sensors, one or some of which are disposed outside the bearing assembly. By way of example, the wireless sensor unit 4 disposed in the wheel support bearing assembly 33 shown in FIG. 10 may be one of the wireless sensor units 4A and 4B of the first embodiment.

Although the present invention has been fully described in connection with the preferred embodiments thereof with reference to the accompanying drawings which are used only for the purpose of illustration, those skilled in the art will readily conceive numerous changes and modifications within the framework of obviousness upon the reading of the specification herein presented of the present invention. By way of example, although in describing any one of the foregoing embodiments the use has been made of the single sensor signal receiving unit 5, a plurality of sensor signal receiving units can be employed in the practice of the present invention. Where the plural sensor signal receiving units are employed, those sensor signal receiving units may be used to receive the sensor signals transmitted from the sensor signal transmitter of the same wireless sensor unit or to receive the sensor signals transmitted from the sensor signal transmitter of the different wireless sensor units.

Also, the sensor signal receiver and the electric power transmitter may not be included within the same sensor signal receiving unit 5 and may be disposed separated from each other. In addition, receipt of the sensor signals may be carried out by different sensor signal receiving units and an electric power may be supplied wireless from the same electric power transmitter 12 to the plural wireless sensor units.

In addition, although in describing any one of the foregoing embodiments the wireless transmission has been described as carried out by the electromagnetic waves, any transmitting method, for example, an electromagnetic coupling, rays of light or ultrasonic waves can be employed for transmitting the sensor signal and the electric operating power.

Accordingly, such changes and modifications are, unless they depart from the scope of the present invention as delivered from the claims annexed hereto, to be construed as included therein.

What is claimed is:

1. A wireless sensor system comprising:
   a plurality of sensors to detect respective parameters to be detected;
   a sensor signal transmitter to transmit wireless sensor signals outputted respectively from the sensors;
   a plurality of electric power receivers to receive wirelessly an electric operating power required to drive the sensors and the sensor signal transmitter;
   a sensor signal receiver to receive the sensor signals transmitted from the sensor signal transmitter; and
   an electric power transmitter to transmit the electric operating power wirelessly to the electric power receiver,
   wherein only one sensor signal receiver is provided for commonly receiving the sensor signals from the plural sensors,
   only one electric power transmitter is provided for commonly transmitting the electric operating power wirelessly to the plural electric power receivers,
   the electric power receiver supplies directly the sensors and the sensor signal transmitter with the electric operating power, and
   the sensor signal receiver includes a single variable tuning circuit for varying to tune to each of natural frequencies transmitted respectively from the plural sensors and a switching element to switch among varying natural frequencies of the tuning circuit to select the varying natural frequencies one at a time on a time sharing basis.

2. The wireless sensor system as claimed in claim 1, wherein the sensor signal receiver has a capability of receiving the sensor signals from the respective sensors, which are transmitted by the sensor signal transmitter, and the electric power transmitter is disposed in a sensor signal receiving unit including the sensor signal receiver.

3. The wireless sensor system as claimed in claim 1, further comprising a single wireless sensor unit including the sensor, the sensor signal transmitter and the electric power receiver,
   wherein the plural sensors are provided in this single wireless sensor unit, and
   the sensor signal transmitter is operable to transmit wireless the sensor signals outputted from the plural sensors.

4. The wireless sensor system as claimed in claim 1, further comprising a plurality of wireless sensor units each including the sensors, the sensor signal transmitter and the electric power receiver.

5. The wireless sensor system as claimed in claim 4, wherein some or all of the plural wireless sensor units each include the plural sensors, and
   the respective sensor signal transmitters in such some or all of the wireless sensor units are operable to transmit wirelessly the sensor signals outputted from the sensors.

6. The wireless sensor system as claimed in claim 5, wherein the plural wireless sensor units are mounted on different bearings in a machine plant.

7. The wireless sensor system as claimed in claim 5, wherein at least one of the plural wireless sensor units includes the sensor utilized as a tirepressure sensor for an automotive vehicle or a rotation sensor for a wheel support bearing assembly.

8. A wireless sensor system comprising:
   a plurality of wireless sensor units corresponding to respective different types of parameters to be detected and arranged in the proximity of a bearing assembly, each of the wireless sensor units including an electric power receiver having a tuning circuit and a detecting and rectifying circuit to secure an electric operating power from an electromagnetic wave of a predetermined power feeding frequency, a sensor to detect a parameter to be detected, and a sensor signal transmitter to transmit a signal outputted from the sensor as a wireless sensor signal in the form of an electromagnetic wave of a natural frequency different from the power feeding frequency; and
   a sensor signal receiving unit to supply wirelessly the electric operating power to each of those wireless sensor units and to receive a sensor signal transmitted from each of those wireless sensor units, the sensor signal receiving unit including an electric power transmitter to transmit wirelessly the electromagnetic wave of the predetermined power feeding frequency and only one sensor signal receiver to receive the wireless sensor signal of the natural frequency that is transmitted wirelessly from each of the wireless sensor units,
   wherein at least one of the wireless sensor units is provided with a plurality of sensors and a signal coordinator to process respective outputs from the sensors so that the sensor signals are discriminately received by the sensor signal receiver,
   only one sensor signal receiving unit is provided for commonly receiving the sensor signals from the plural sensors and for commonly transmitting the electromagnetic wave to the plural electric power receivers, and
   the sensor signal receiver includes a single variable tuning circuit for varying to tune to each of natural frequencies transmitted respectively from the plural sensors and a switching element to switch among varying natural frequencies of the tuning circuit to select the natural frequencies one at a time on a time sharing basis.

9. The wireless sensor system as claimed in claim 8, wherein the electromagnetic wave for power feeding has a plane of polarization that is different from that of the electromagnetic wave of the wireless sensor signal.

10. The wireless sensor system as claimed in claim 8, wherein the respective electromagnetic waves of the wireless sensor signals transmitted from the associated wireless sensor units have different planes of polarization.

11. The wireless sensor system as claimed in claim 8, wherein the plural wireless sensor units are mounted on different bearings in a machine plant.

12. The wireless sensor system as claimed in claim 8, wherein at least one of the plural wireless sensor units includes the sensor utilized as a tire pressure sensor for an automotive vehicle or a rotation sensor for a wheel support bearing assembly.

13. A bearing assembly equipped with a wireless sensor unit, comprising:
   a plurality of wireless sensor units mounted on a bearing, each of the wireless sensor units including:
      a sensor to detect a parameter to be detected;
      a sensor signal transmitter to transmit wirelessly a sensor signal outputted from the sensor; and
      an electric power receiver to receive wirelessly an electric operating power required to drive the sensor and the sensor signal transmitter,
   wherein the plural wireless sensor units are operable to transmit to one common sensor signal receiver the respective sensor signals transmitted from the corresponding sensor signal transmitters,
   only one electric power transmitter is provided for commonly transmitting the electric operating power wirelessly to the plural electric power receivers,
   the electric power receiver supplies directly the sensors and the sensor signal transmitter with the electric operating power, and
   the sensor signal receiver includes a single variable tuning circuit for varying to tune to each of natural frequencies transmitted respectively from the plural sensors and a switching element to switch among varying natural frequencies of the tuning circuit to select the natural frequencies one at a time on a time sharing basis.

14. The bearing assembly as claimed in claim 13, wherein the sensor is disposed within a sealed space in the bearing, which is shielded from the outside, and the electric power receiver and the sensor signal transmitter are disposed outside the bearing.

15. The bearing assembly as claimed in claim 13, wherein at least one of the sensors mounted on the bearing is a rotation sensor including a multipolar magnet, having a plurality of magnetic poles deployed in a direction circumferentially thereof, and a magnetic sensor to detect the magnetic poles of the multipolar magnet.

16. The bearing assembly as claimed in claim 15, wherein the magnetic sensor is a magnetoresistive sensor.

17. A bearing assembly equipped with a wireless sensor unit, comprising:
   one of a plurality of wireless sensor units that is mounted on a bearing,
   wherein the plural wireless sensor units each include
      a sensor to detect a parameter to be detected;
      a sensor signal transmitter to transmit wirelessly a sensor signal outputted from the sensor; and
      an electric power receiver to receive wirelessly an electric operating power required to drive the sensor and the sensor signal transmitter by supplying directly the sensors and the sensor signal transmitter with the electric operating power; and
   wherein the plural wireless sensor units are operable to transmit to one common sensor signal receiver the respective sensor signals transmitted from the corresponding sensor signal transmitters and are also operable to receive wirelessly the electric operating power from one common electric power transmitter through the respective electric power receiver, and
   the sensor signal receiver includes a single variable tuning circuit for varying to tune to each of natural frequencies transmitted respectively from the plural sensors and a switching element to switch among varying natural frequencies of the tuning circuit to select the natural frequencies one at a time on a time sharing basis.

18. The bearing assembly as claimed in claim 17, wherein the sensor is disposed within a sealed space in the bearing, which is shielded from the outside, and the electric power receiver and the sensor signal transmitter are disposed outside the bearing.

19. The bearing assembly as claimed in claim 17, wherein at least one of the sensors mounted on the bearing is a rotation sensor including a multipolar magnet, having a plurality of magnetic poles deployed in a direction circumferentially thereof, and a magnetic sensor to detect the magnetic poles of the multipolar magnet.

20. The bearing assembly as claimed in claim 19, wherein the magnetic sensor is a magnetoresistive sensor.

21. A bearing assembly equipped with a wireless sensor, comprising:
   a plurality of sensors to detect respective parameters to be detected;
   a sensor signal transmitter to transmit wireless sensor signals outputted from the respective sensors; and
   an electric power receiver to receive wirelessly an electric operating power required to drive the sensors and the sensor signal transmitter,
   wherein the plural wireless sensor units are operable to transmit to one common sensor signal receiver the respective sensor signals transmitted from the corresponding sensor signal transmitters,
   only one electric power transmitter is provided for commonly transmitting the electric operating power wirelessly to the plural electric power receivers,
   the electric power receiver supplies directly the sensors and the sensor signal transmitter with the electric operating power, and
   the sensor signal receiver includes a single variable tuning circuit for varying to tune to each of natural frequencies transmitted respectively from the plural sensors and a switching element to switch among varying natural frequencies of the tuning circuit to select the natural frequencies one at a time on a time sharing basis.

22. The bearing assembly as claimed in claim 21, wherein the sensor is disposed within a sealed space in the bearing, which is shielded from the outside, and the electric power receiver and the sensor signal transmitter are disposed outside the bearing.

23. The bearing assembly as claimed in claim 21, wherein at least one of the sensors mounted on the bearing is a rotation sensor including a multipolar magnet, having a plurality of magnetic poles deployed in a direction circumferentially thereof, and a magnetic sensor to detect the magnetic poles of the multipolar magnet.

24. The bearing assembly as claimed in claim 23, wherein the magnetic sensor is a magnetoresistive sensor.

25. A wheel support bearing assembly for rotatably supporting a vehicle wheel relative to a vehicle body structure, the wheel support bearing assembly comprising:

an outer member having a plurality of outer raceways;

an inner member having inner raceways aligned with the outer raceways;

a plurality of rows of rolling elements interposed between the outer raceways and the inner raceways; and one of a plurality of wireless sensor units mounted on the wheel support bearing assembly, the plural wireless sensor units each including a sensor to detect a parameter to be detected, a sensor signal transmitter to transmit wirelessly a sensor signal outputted from the sensor and an electric power receiver to receive wirelessly an electric operating power required to drive the sensor and the sensor signal transmitter by supplying directly the sensors and the sensor signal transmitter with the electric operating power, the plural wireless sensor units are operable to transmit the respective sensor signals to one common sensor signal receiver through the corresponding sensor signal transmitters and also operable to receive wirelessly the electric operating power from one common electric power transmitter through the electric power receiver, and the sensor signal receiver includes a single variable tuning circuit for varying to tune to each of natural frequencies transmitted respectively from the plural sensors and a switching element to switch among varying natural frequencies of the tuning circuit to select the natural frequencies one at a time on a time sharing basis.

26. A wireless sensor system comprising:

a wheel support bearing assembly as defined in claim 25;

a sensor signal receiver for receiving the sensor signal transmitted from the sensor signal transmitter in the wheel support bearing assembly; and an electric power transmitter for transmitting wireless the electric operating power to the electric power receiver, wherein the sensor signal receiver and the electric power transmitter are disposed in a tire house of the vehicle body structure, where the wheel support bearing assembly is installed, or disposed in a portion of the vehicle body structure, which is more distant from the tire house with respect to the wheel support bearing assembly.

27. A wheel support bearing assembly for rotatably supporting a vehicle wheel relative to a vehicle body structure, the wheel support bearing assembly comprising:

an outer member having a plurality of outer raceways;

an inner member having inner raceways aligned with the outer raceways;

a plurality of rows of rolling elements interposed between the outer raceways and the inner raceways;

a plurality of sensors to detect respective parameters to be detected;

a sensor signal transmitter to transmit wireless sensor signals outputted from the respective sensors;

an electric power receiver to receive wireless an electric operating power required to drive the sensors and the sensor signal transmitter, wherein the plural wireless sensor units are operable to transmit to one common sensor signal receiver the respective sensor signals transmitted from the corresponding sensor signal transmitters, only one electric power transmitter is provided for commonly transmitting the electric operating power wirelessly to the plural electric power receivers, the electric power receiver supplies directly the sensors and the sensor signal transmitter with the electric operating power, and the sensor signal receiver includes a single variable tuning circuit for varying to tune to each of natural frequencies transmitted respectively from the plural sensors and a switching element to switch among varying natural frequencies of the tuning circuit to select the natural frequencies one at a time on a time sharing basis.

28. A wireless sensor system comprising:

a wheel support bearing assembly as defined in claim 27;

a sensor signal receiver for receiving the sensor signal transmitted from the sensor signal transmitter in the wheel support bearing assembly; and an electric power transmitter for transmitting wireless the electric operating power to the electric power receivers, wherein the sensor signal receiver and the electric power transmitter are disposed in a tire house of the vehicle body structure, where the wheel support bearing assembly is installed, or disposed in a portion of the vehicle body structure, which is more distant from the tire house with respect to the wheel support bearing assembly.

* * * * *

UNITED STATES PATENT AND TRADEMARK OFFICE
CERTIFICATE OF CORRECTION

| | |
|---|---|
| PATENT NO. | : 7,561,035 B2 |
| APPLICATION NO. | : 10/526903 |
| DATED | : July 14, 2009 |
| INVENTOR(S) | : Koji Sahashi et al. |

It is certified that error appears in the above-identified patent and that said Letters Patent is hereby corrected as shown below:

Column 20, Line 27, change "tirepressure" to --tire pressure--.

Column 24, Line 38, change "receivers," to --receiver,--.

Signed and Sealed this

Third Day of November, 2009

David J. Kappos
*Director of the United States Patent and Trademark Office*